United States Patent [19]

Amano et al.

[11] Patent Number: 5,284,922
[45] Date of Patent: Feb. 8, 1994

[54] ORGANIC OPTICAL NONLINEAR MATERIAL AND OPTICAL NONLINEAR DEVICE

[75] Inventors: Michiyuki Amano; Yoshito Shuto; Toshikuni Kajno, all of Ibaraki, Japan

[73] Assignee: Nippon Telegraph and Telephone Corporation, Japan

[21] Appl. No.: 35,568

[22] Filed: Mar. 23, 1993

Related U.S. Application Data

[63] Continuation of Ser. No. 725,205, Jul. 3, 1991, abandoned.

[30] Foreign Application Priority Data

Jul. 6, 1990 [JP] Japan .................. 2-178700

[51] Int. Cl.$^5$ .......................................... C08F 220/54
[52] U.S. Cl. .......................... 525/328.2; 525/329.7; 525/330.3; 525/330.5; 525/333.6; 525/293; 525/296; 525/426; 525/436; 520/298; 520/311; 528/75; 528/85; 528/111
[58] Field of Search ............... 526/298, 311; 525/293, 525/295, 329.7, 330.3, 330.5, 333.6, 328.2, 426, 436; 528/75, 85, 111

[56] References Cited

U.S. PATENT DOCUMENTS

| | | | |
|---|---|---|---|
| 4,101,269 | 6/1978 | Champenois | 8/4 |
| 4,757,130 | 7/1988 | DeMartino | 528/288 |
| 4,855,376 | 8/1989 | DeMartino et al. | 526/311 |
| 4,935,292 | 6/1990 | Marks et al. | 428/220 |
| 4,999,401 | 3/1991 | Wreesmann et al. | 525/279 |
| 5,043,391 | 8/1991 | Wreesmann et al. | 525/279 |

FOREIGN PATENT DOCUMENTS

| | | |
|---|---|---|
| 0048214 | 3/1982 | European Pat. Off. |
| 0244288 | 11/1987 | European Pat. Off. |
| 0271730 | 6/1988 | European Pat. Off. |
| 0406888 | 1/1991 | European Pat. Off. |

OTHER PUBLICATIONS

Möhlmann, G. R. (1990) Synthetic Metals 37, 207–221.
Singer, K. D. et al. (1988) Appl. Phys. Lett. 53, 1800–1802.
R. Lytel (1990) SPIE 1216, 30–40.
P. Kaczmarski et al. (1989) IEE Proc. 136(J), 152–158.
M. Engel et al. (1985) Pure Appl. Chem. 57(7), 1009–1014.

*Primary Examiner*—Joseph L. Schofer
*Assistant Examiner*—Mark Nagumo
*Attorney, Agent, or Firm*—Blakely, Sokoloff, Taylor & Zafman

[57] ABSTRACT

In a second-order or third-order organic nonlinear optical material, one of compounds represented by the following formulas (1) and (2) is bonded to a polymer:

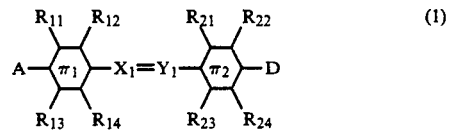

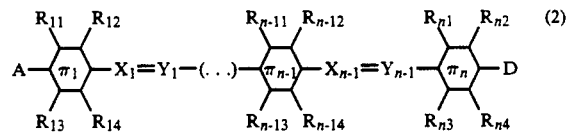

wherein each of $\pi_1$ to $\pi_n$ independently represents a cyclic compound of a $\pi$ electron conjugate system, at least one of $R_{11}$ to $R_{n4}$ represents an alkyl substituting group derivative and others represent hydrogen, each of $X_1$ to $X_{n-1}$ and $Y_1$ to $Y_{n-1}$ represents one member selected from the group consisting of CH, N, and N→O, A represents an electron acceptor group, D represents an electron donor group, and n is an integer of 3 or more.

14 Claims, 3 Drawing Sheets

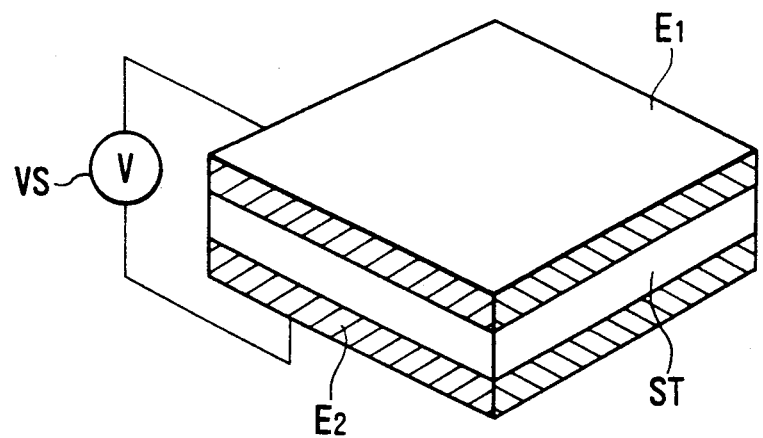
F I G. 1
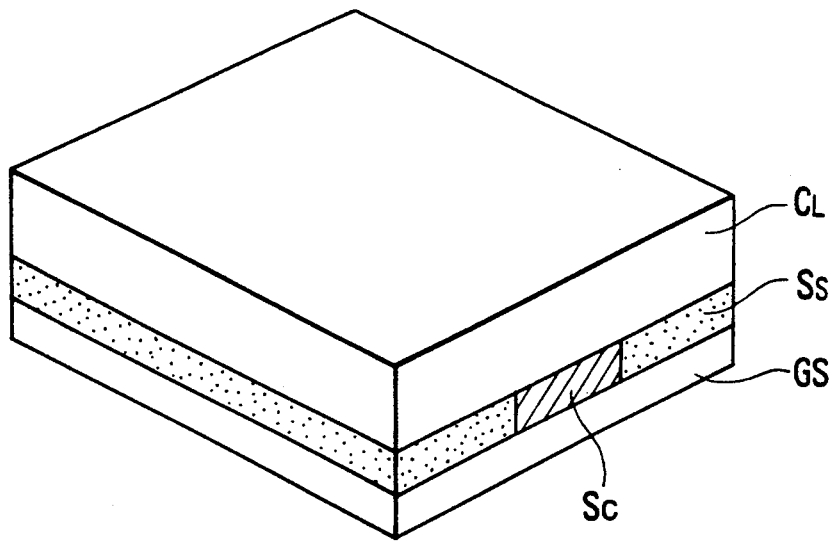
F I G. 2
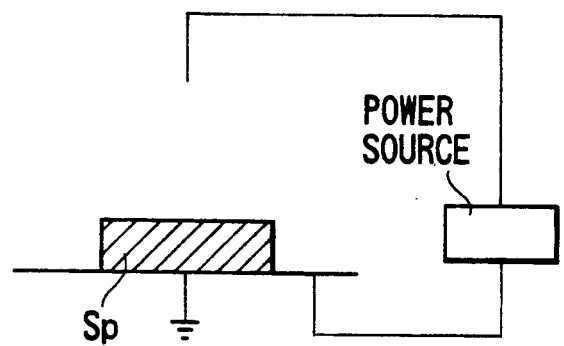
F I G. 3

ORGANIC OPTICAL NONLINEAR MATERIAL AND OPTICAL NONLINEAR DEVICE

This is a continuation of application Ser. No. 07/725,205 filed Jul. 3, 1991, abandoned.

BACKGROUND OF THE INVENTION

The present invention relates to an organic nonlinear optical material and an optical nonlinear device using the same and, more particularly, to a polymer material having a large second-order or third-order optical nonlinear effect and an optical nonlinear device using the same.

Recently, a technique of manufacturing an optical nonlinear device such as an optical modulator or an optical bistable device by using a transparent polymer containing a dye material having a large second-order or third-order optical nonlinearity has been studied. A material used in the technique is generally formed by chemically bonding a dye having a large second-order or third-order nonlinear molecular susceptibility to the main chain of a transparent polymer. An example of the dye material is a conjugate $\pi$ electron system having a donor or an acceptor. More specifically, it is reported that a second-order or third-order optical nonlinearity was measured by bonding an azo dye (K. D. Singer et al., Appl. Phys. Lett. 53, 1800, (1988)) or a stilbene dye compound R is the copolymer of p-hydroxystyrene and methylmethacrylate to the main chain of polymethylmethacrylate. It is also known that an optical nonlinear coefficient can be increased by increasing the content of an optical nonlinear dye. As a device forming method, there is proposed a method of forming a waveguide optical nonlinear device using a polymer film as an optical waveguide by ion or plasma etching or radiation of visible or ultraviolet rays. When the polymer material is used as a third-order optical nonlinear material, no special treatment need be performed after device formation. However, when the material is used as a second-order optical nonlinear material, poling alignment must be performed to uniformize directions of dipoles in an optical nonlinear dye portion. For this purpose, a poling treatment is performed in a DC electric field.

A waveguide optical nonlinear device for use in optical communications or optical information processing systems is practically designed to be connected to a single-mode optical fiber (P. Kaczmarski et al., IEEE PROCEEDINGS, Vol. 136, No. 3, 1989, pp. 152-158), and a waveguide itself is required to function as a single-mode waveguide (R. Lytel et al., SPIE VOL. 1216, 1990, pp. 30-40). The above references disclose that the thickness of an optical nonlinear waveguide must be 3 to 5 $\mu$m or more for this purpose. However, in the manufacture of a waveguide optical nonlinear device, no polymer film satisfactory as a practical optical waveguide can be obtained at a high dye content at which a large second-order or third-order optical nonlinear effect can be obtained. Actually, it is impossible to manufacture an optical nonlinear device which can be incorporated in an optical communication system. More specifically, it is difficult to manufacture an optically uniform film having a uniform thickness corresponding to an optical waveguide size. As a result, only an optical waveguide having a large transmission loss can be manufactured.

A polymer film containing a second-order or third-order optical nonlinear component at a high content and satisfactory as a practical optical waveguide cannot be manufactured as described above mainly for the following reasons. That is, since the polymer film is very hard to dissolve in a polymer solvent, it is impossible to perform manufacture of an optical waveguide film according to a spin coating method or a dipping method which is the most general method in the manufacture of a polymer film in a single step. As a result, the spin coating or dipping method must be repeated a plurality of times to obtain a film thickness required for an optical waveguide. Therefore, a film becomes optically nonuniform on film boundary surfaces formed in the respective steps, and a dimensional precision of a film thickness is very poor.

As described above, a polymer material containing a second-order or third-order nonlinear component at a high content cannot be used as a practical optical nonlinear device material regardless of its large second-order or third-order optical nonlinear coefficient.

SUMMARY OF THE INVENTION

It is an object of the present invention to provide a second-order or third-order organic nonlinear optical material suitable as an optical waveguide.

It is another object of the present invention to provide an organic nonlinear optical material and an optical nonlinear device which are optically uniform and have a higher dimensional precision and a smaller transmission loss than those of conventional materials and devices.

That is, according to the present invention, there are provided a glassy polymer material and an optical nonlinear device using the same, in a polymer material containing a component having a large second-order or third-order molecular susceptibility at a high concentration. The polymer has high solubility in a spin coating solvent, a polymerization solvent, and a polymer reaction solvent generally used in a polymer material, and enables manufacture of an optical waveguide film which is optically uniform and has a uniform film thickness with high dimensional precision.

According to one aspect of the present invention, there is provided a second-order or third-order organic nonlinear optical material, wherein one of compounds represented by the following formulas (1) and (2) is bonded to a polymer:

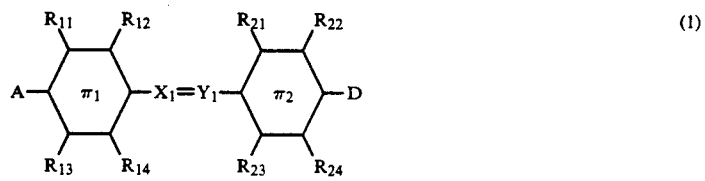

(1)

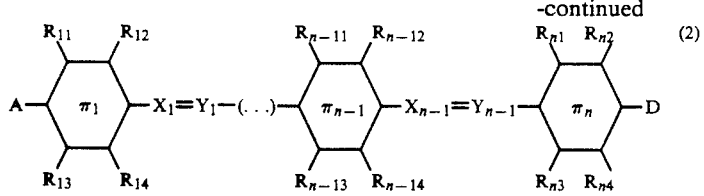

wherein each of $\pi_1$ to $\pi_n$ independently represents a cyclic compound of a $\pi$ electron conjugate system, at least one of $R_{11}$ to $R_{n4}$ represents an alkyl substituting group derivative and others represent hydrogen, each of $X_1$ to $X_{n-1}$ and $Y_1$ to $Y_{n-1}$ represents one member selected from the group consisting of CH, N, and N→O, A represents an electron acceptor group, D represents an electron donor group, and n is an integer of 3 or more.

A copolymer represented by each of formulas (1) and (2) has a conjugate n electron system and a donor and an acceptor, and therefore is expected to have a large second-order or third-order optical nonlinearity.

A second-order nonlinear optical material can be manufactured by applying a DC electric field to or charging the above material having a third-order nonlinearity while the material is softened or melted and solidifying the material under cooling.

The present invention also relates to a waveguide optical nonlinear device comprising the above material having a second-order or third-order optical nonlinearity as a core layer and a material having a refractive index smaller than that of the above material as a cladding layer. In this case, the cladding material includes air or a vacuum state in which no material is apparently present.

The present invention will be described in detail below.

In the organic nonlinear optical material according to the present invention, one of the copolymers having the following structures (1) and (2) is bonded to a polymer as described above:

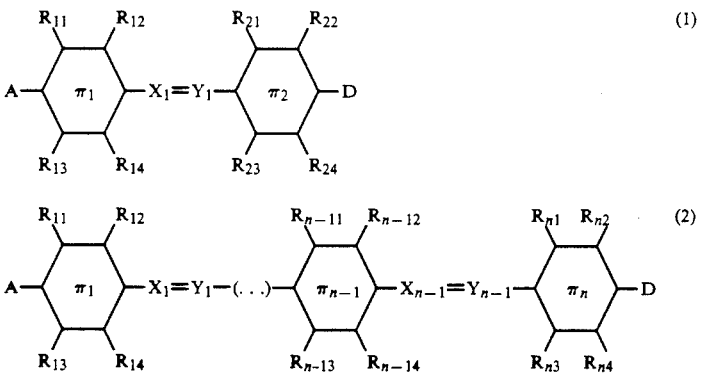

In the above formulas (1) and (2), the following chemical structures can be used as $X_n=Y_n$:

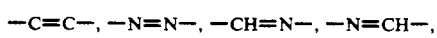

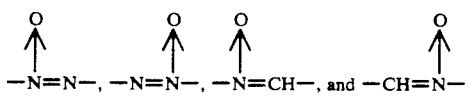

wherein

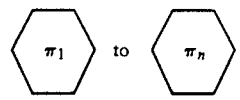

represent $\pi$ electron conjugate cyclic compounds such as a benzene ring, a pyrimidine ring, an oxazole ring, a furan ring, a thiazole ring, an oxathiazole ring, a benzothiazole ring, a benzoxazole ring, a benzoxathiazole ring, a naphthalene ring, an anthracene ring, and an isoquinoline ring having the same structure or different structures.

Examples of an electron acceptor group A are —$NO_2$, —CN, —COOH, —$COCH_3$, —CHO, —$CONH_2$, —CH=$C(CN)_2$, —$C(CN)$=$C(CN)_2$, and a halogen, and examples of an electron donor group D are —SH, —SR, —OH, —OB, —$NH_2$, and NB, $B_2$. Each of B, $B_1$, and $B_2$ preferably consists of a functional group such as —$(CH_2)_n$—OH, —$(CH_2)_n$—$NH_2$, —$(CH_2)_n$—SH, an alkyl group, or hydrogen.

Each of $B_1$ and $B_2$ is one of the above functional groups, and they may be the same or different. At least one of $R_1$ and $R_2$ preferably has —OH, —$NH_2$, or —SH as its terminal end group so as to be bonded to a polymer.

Examples of $R_{11}$ to $R_{n4}$ are —$CH_3$, —$CH_2OH$, —$CH_2NH_2$, —$CH_2X$ (X represents a halogen), —$CH_2CH_3$, —$CH_2CH_2OH$, —$CH_2CH_2NH_2$, —$CH_2CH_2X$, —$CH(CH_3)_2$, and —$C(CH_3)_3$. At least one of $R_{11}$ to $R_{n4}$ is preferably bonded per cyclic compound. Note that the alkyl group or the alkyl derivative described above need not be bonded in all of $\pi_1$ to $\pi_n$ in formulas (1) and (2) but at least one of the alkyl group and the alkyl derivative need only be bonded in at least one of $\pi_1$ to $\pi_n$.

In the present invention, by introducing the alkyl group or the alkyl derivative group described above to a nonlinear optical component, there is provided a nonlinear optical polymer solution having a solubility and a solution viscosity sufficient to form an optically uniform polymer film having an arbitrary and uniform film thickness (free from a film thickness variation) which is generally required for an optical waveguide in a single step of casting or dipping with respect to various types of solvents generally used in the manufacture of a polymer film, even when the optical nonlinear component is bonded to a polymer at a high concentration. Examples of the solvent are tetrahydrofuran, chlorobenzene, methyl isobutyl ketone, methyl ethyl ketone, cellosolve acetate, chloroform, methylene chloride, dimethylformamide, and dimethylsulfoxide. A film having a uniform thickness can be obtained because the film is formed from a solution having a high viscosity.

In the present invention, when the material is used as a third-order nonlinear optical material, no special treatment need be performed after formation of a device structure. On the other hand, when the material is used as a second-order nonlinear optical material, a poling treatment is required. In the present invention, the poling treatment is performed by applying a DC electric field to or charging the material while the material is softened or melted and then solidifying the material. The electric field application is performed by mounting electrodes on a sample, and corona discharging can be used as the charging. The sample can be solidified by either cooling or thermally curing a polymer. In either case, the solidification is preferably performed while the sample is applied with an electric field or charged.

According to another aspect of the present invention, there is provided a nonlinear optical device comprising the organic second-order or third-order nonlinear optical polymer material as a core structure and a material having a refractive index smaller than that of the core structure as a cladding structure material. Note that the cladding material includes air or a vacuum state in which no material is apparently present. The nonlinear optical device is an optical device using a second-order or third-order nonlinear optical effect. Examples of the second-order nonlinear optical device are a second harmonic generating device, an optical parametric amplifying device, and an optical switching (electrooptical) device. Examples of the third-order nonlinear optical device are a third harmonic generating device, a three wave mixing device, a four wave mixing device, and an optical switch (using a Kerr effect), and an optical bistable device. The second-order or third-order nonlinear optical material film used in the present invention can be manufactured to have an arbitrary film thickness, has a high dimensional precision, and is optically uniform. Therefore, an optical waveguide having a shape and a size corresponding to its application can be precisely manufactured from the film. For example, since an optical waveguide corresponding to the size and shape of a quartz-based single-mode optical fiber core often used in the field of optoelectronics can be manufactured, an insertion loss into the waveguide can be reduced. In addition, since the dimensional precision is high, a waveguide device having a small disturbance in a guided mode and good transmission characteristics can be manufactured. Furthermore, since an optically uniform polymer film can be formed, a device having a small transmission loss can be manufactured. The cladding structure material is generally a polymer material excellent in molding properties, dimensional precision, and transparency (optical transmission characteristics). The polymer material is one member selected from the group consisting of polysiloxane, polyester, polycarbonate, polymethacrylate, polyacrylate, polystyrene, polyamide, polyimide, polyurethane, polyether, and their derivatives and copolymers. An optical waveguide structure in the nonlinear optical device is generally of a slab, ridge, or channel type, and optical waveguide thickness control is performed controlling casting or dipping conditions, i.e., the concentration or the viscosity of a polymer solution or the rotation speed of a spinner. Waveguide width control is performed by applying a polymer micropatterning technique represented by ion or plasma etching or radiation of visible or ultraviolet rays. When the device is used as a third-order nonlinear optical device, no special treatment need be performed after device formation. The poling treatment required to obtain a second-order optical nonlinearity is performed by the method described above. The poling treatment can be performed at an any timing before, after, and during device structure formation.

The polymer structure in the present invention is one member selected from the group consisting of polysiloxane, polyester, polycarbonate, polymethacrylate, polyacrylate, polystyrene, polyamide, polyimide, polyurethane, polyether, and their derivatives and copolymers. The optical nonlinear component may be either bonded to a polymer main chain or contained as a part of the polymer main chain.

As described above, the present invention can provide a polymer film having an arbitrary thickness, which is better in dimensional precision, optically more uniform and larger in second-order or third-order nonlinear optical constant than a conventionally existing polymer film having an optical nonlinearity. In addition, a second-order or third-order waveguide type nonlinear optical device having an arbitrary shape, which is excellent in dimensional precision and therefore transmission characteristics and has a small transmission loss, can be manufactured. Therefore, the device of the present invention can be used as a waveguide type nonlinear optical device for use in various fields, e.g., the field of optoelectronics such as optical transmission or optical information processing.

BRIEF DESCRIPTION OF THE DRAWINGS

FIG. 1 is a perspective view showing a structure of counter electrodes sandwiching a sample of the present invention;

FIG. 2 is a perspective view showing an optical waveguide device according to the present invention;

FIG. 3 is a schematic view showing an arrangement of a corona discharge apparatus;

DETAILED DESCRIPTION OF THE PREFERRED EMBODIMENTS

Figure 4A:
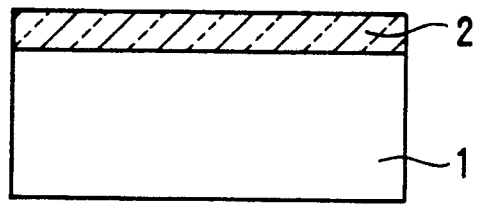
FIGS. 4A to 4D are sectional views showing a method of manufacturing a channel waveguide according to the present invention.
Figure 4B:
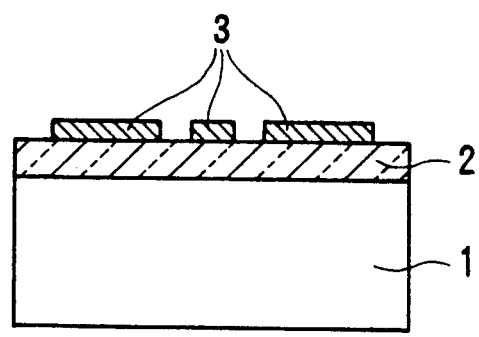
Figure 4C:
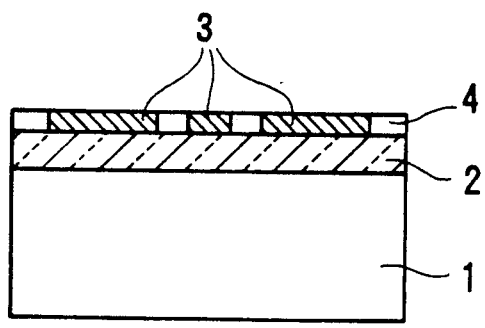
Figure 4D:
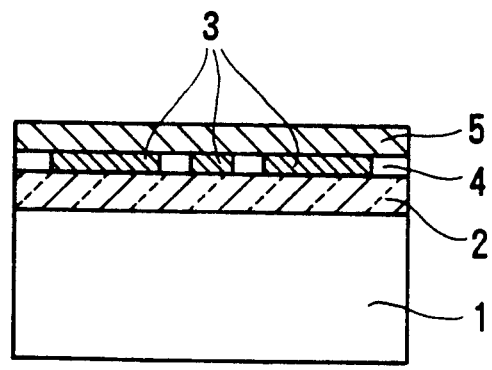

The present invention will be described in more detail below by way of its examples.

EXAMPLE 1

Copolymers 1, 2, and 3 presented below were synthesized. Synthesis of the copolymer 1 was performed as will be described below, and the copolymers 2 and 3 were synthesized following the same procedures as for the copolymer 1. The basic structure of the copolymers 1, 2, and 3 was as follows:

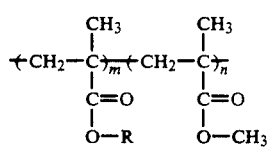

The structure of R of this formula was different among the copolymers 1 to 3:

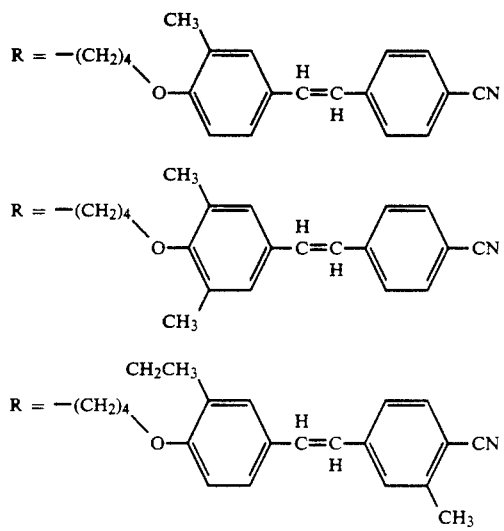

Synthesis of Copolymer 1

3-methyl-4-hydroxybenzaldehyde and 4-chloro-1-butanol were reacted with each other under reflux in methanol for 24 hours in the presence of potassium hydride and potassium iodide. After the reaction, the reaction mixture was mixed with water, and a product A was extracted by diethylether.

Subsequently, the product A and 4-cyanophenylacetic acid were reacted with each other in the presence of piperidine at 90° C. to 110° C. for three hours. After the reaction, the reaction mixture was mixed with water, and a precipitated solid was collected and washed with ethanol to obtain a compound B.

The compound B was reacted with methacryloyl chloride in dry tetrahydrofuran at room temperature for 24 hours in the presence of triethylamine. After the reaction, the reaction mixture was mixed with water, and a precipitated product was collected. The collected product was purified through a silica gel column to obtain a compound C.

The compound C was mixed with methylmethacrylate at a ratio of m to n, and azobisisobutyronitrile was mixed in an amount corresponding to a 1 mol % of the resultant mixture. After dissolved oxygen was removed by repeating a cycle of freezing-deaeration-dissolution, the resultant material was encapsulated in an ampoule and polymerized at 65° C. for 24 hours. After the reaction, the polymer was dissolved in chloroform, and reprecipitation was done by methanol to purify the resultant material, thereby obtaining the copolymer 1.

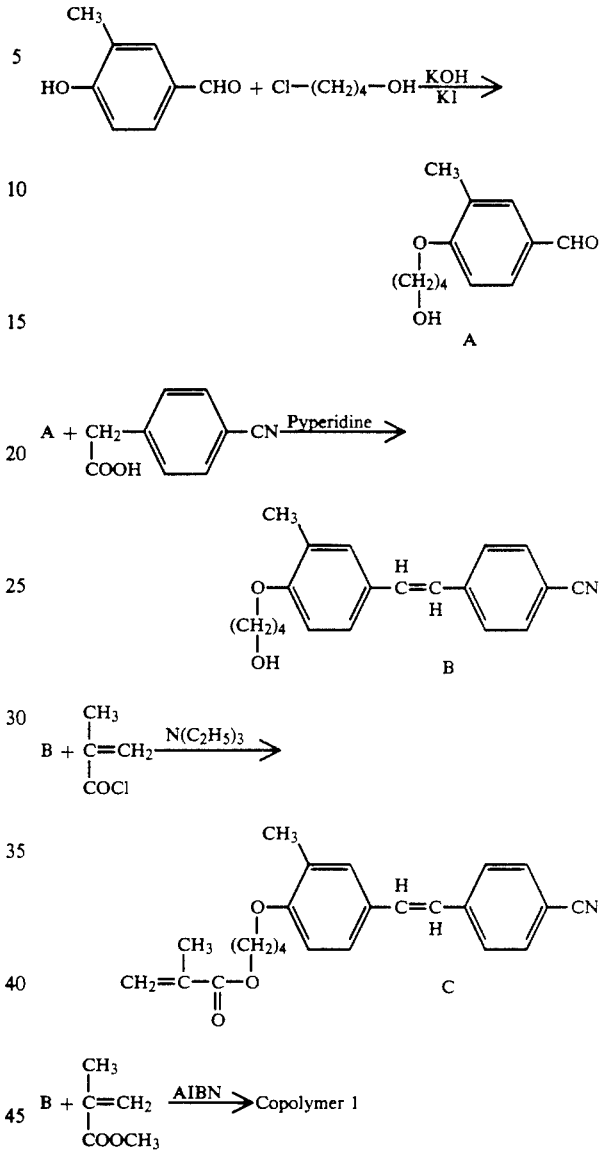

Film formation was performed from a chlorobenzene solution by a spin coating method. A solubility in chlorobenzene, a film thickness obtained by spin coating of one step, and a corresponding film thickness variation were as shown in Table 1.

A film consisting of each of the copolymers 1, 2, and 3 was formed on a glass substrate by the spin coating method, and the resultant sample was sandwiched between counter electrodes as shown in FIG. 1 and applied with an electric field of 1.5 MV/cm at an atmospheric temperature of 140° C. The atmospheric temperature was decreased at a rate of 5° C./min, and the electric field was continuously applied until the temperature became 40° C. or less. After the electric field was disconnected, the sample was removed from the electrodes, and its second-order nonlinear optical coefficient ($\chi^{(2)}$) was measured at a fundamental wavelength of 1.064 μm. As a result, values of the copolymers 1, 2, and 3 were $5.1 \times 10^{-8}$ esu, $5.2 \times 10^{-8}$ esu, and $4.9 \times 10^{-8}$ esu, respectively.

Subsequently, a 5.0-μm thick film consisting of each of the copolymers 1, 2, and 3 was formed on a glass substrate. A chrome mask corresponding to a 5.0-μm wide waveguide shape was set on the resultant substrate, and ultraviolet rays were radiated on the substrate for 15 minutes by using a 100-W heavy hydrogen lamp. After the mask was removed, it was confirmed by measurement using an ellipsometer that a refractive index in a portion irradiated with ultraviolet rays was smaller than that in a non-irradiated portion. As a result, a core portion having a width of 5.0 μm was formed. The obtained film was treated in an electric field following the same procedures as described above, and the same type of glass as the substrate was adhered on the film to constitute an optical waveguide device as shown in FIG. 2. The end faces of the device were optically polished, and a 830-nm semiconductor laser (power=40 mW) was incident on the core portion by direct coupling with the end face of a single-mode optical fiber. As a result, a 415-nm blue second harmonic (SH) wave from the opposite core end face was observed. Table 2 shows a transmission loss of each optical waveguide and its conversion efficiency from the fundamental wave to the SH wave.

TABLE 1

| Material No. | Optical nonlinear material content (mol %) | Solubility (% w/w) | Film thickness (μm) | Film thickness variation (%/cm$^2$) |
|---|---|---|---|---|
| 1 | 50 | 15 | 15 | 0.3 |
| 2 | 55 | 30 | 30 | 0.4 |
| 3 | 60 | 26 | 24 | 0.3 |

TABLE 2

| Material No. | Transmission loss (dB/cm) | Conversion efficiency (%) |
|---|---|---|
| 1 | 0.9 | 5.5 |
| 2 | 1.0 | 7.2 |
| 3 | 0.9 | 7.5 |

COMPARATIVE EXAMPLE b 1

A copolymer 4 presented below was synthesized following the same procedures as for the copolymer 1. Film formation was performed from a chlorobenzene solution by the spin coating method. A solubility in chlorobenzene, a film thickness obtained by spin coating of one step, and a corresponding film thickness variation were as shown in Table 3.

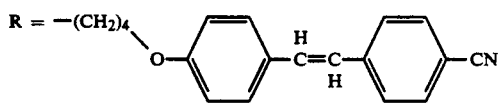

$R = -(CH_2)_4-$ ... 4

Films consisting of the copolymer 4 were formed on glass substrates by the spin coating method, and each substrate ST was sandwiched between counter electrodes E1 and E2 as shown in FIG. 1 and applied with an electric field of 1.5 MV/cm from a voltage source VS at an atmospheric temperature of 140° C. The atmospheric temperature was decreased at a rate of 5° C./min, and the electric field was continuously applied until the temperature became 40° C. or less. After the electric field was disconnected, the sample was removed from the electrodes, and its second-order nonlinear optical coefficient ($\chi^{(2)}$) was measured at a fundamental wavelength of 1.064 μm. As a result, the $\chi^{(2)}$ value was $4.0 \times 10^{-8}$ esu.

Subsequently, a 0.4-μm thick film consisting of the copolymer 4 was formed on glass substrate GS. A chrome mask corresponding to a 5.0-μm wide waveguide shape was set on the substrate GS, and ultraviolet rays were radiated on the substrate for 15 minutes by using a 100-W heavy hydrogen lamp. After the mask was removed, it was confirmed by measurement using an ellipsometer that a refractive index in a portion irradiated with ultraviolet rays was smaller than that in a non-irradiated portion. As a result, a core portion Sc having a width of 5.0 μm was formed. The obtained film was treated in an electric field following the same procedures as described above, and the same type of glass as the substrate was adhered on the film to constitute an optical waveguide device as shown in FIG. 2. The end faces of the device were optically polished, and a 830-nm semiconductor laser (power=40 mW) was incident on the core portion by direct coupling with the end face of a single-mode optical fiber. As a result, the coupling efficiency was very low, and the power of a 415-nm blue second harmonic (SH) wave from the opposite core end face was 1/100 or less that obtained in Example 1. Note that in FIG. 2, reference symbol Ss denotes an optical nonlinear polymer layer; and CL, an upper cladding portion.

Subsequently, a 5.0-μm thick film consisting of the copolymer 4 was formed on a glass substrate by repeatedly performing spin coating 50 times or more. A chrome mask corresponding to a 5.0-μm wide waveguide shape was set on the resultant substrate, and ultraviolet rays were radiated on the substrate for 15 minutes by using a 100-W heavy hydrogen lamp. However, a film thickness variation was as large as 25%/cm$^2$, and it was not confirmed after the mask was removed that a refractive index in a portion irradiated with ultraviolet rays was smaller than that in a non-irradiated portion. The obtained film was treated in an electric field following the same procedures as described above, and the same type of glass as the substrate was adhered on the film to constitute an optical waveguide device as shown in FIG. 2. The end faces of the device were optically polished, and a 830-nm semiconductor laser (power=40 mW) was incident on the core portion by direct coupling with the end face of a single-mode optical fiber. As a result, a 415-nm blue second harmonic (SH) wave from the opposite core end face was observed. However, since a transmission loss of the waveguide film was vary large, a conversion efficiency of the light emerging from the core end face was at most 1/550 to 1/750 that obtained in Example 1. Table 4 shows a transmission loss of the optical waveguide and its conversion efficiency from the fundamental wave to the SH wave.

TABLE 3

| Material No. | Optical nonlinear material content (mol %) | Solubility (% w/w) | Film thickness (μm) | Film thickness variation (%/cm$^2$) |
|---|---|---|---|---|
| 4 | 50 | 3 | 0.1 | 15 |

TABLE 4

| Material No. | Transmission loss (dB/cm) | Conversion efficiency (%) |
|---|---|---|
| 4 | 25 | 0.01 |

EXAMPLE 2

Copolymers 5, 6 and 7 presented below were synthesized following the same procedures as for the compound 1.

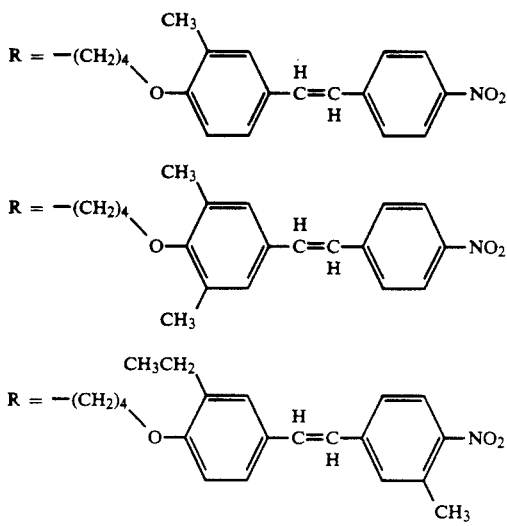

The basic structure of the copolymers 5 to 7 was as follows:

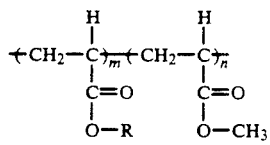

Film formation was performed from a chlorobenzene solution by the spin coating method. A solubility in chlorobenzene, a film thickness obtained by spin coating of one step, and a corresponding film thickness variation were as shown in Table 5.

A film consisting of each of the copolymers 5, 6, and 7 was formed on a glass substrate by the spin coating method, and each resultant sample SP was set in a corona discharge apparatus CD as shown in FIG. 3 and irradiated with a corona discharge current of 10 $\mu$A at an atmospheric temperature of 140° C. The atmospheric temperature was decreased at a rate of 5° C./min, and the corona discharge current was continuously radiated until the temperature became 40° C. or less. After the discharge was finished, the sample SP was removed from the discharge apparatus, and its second-order nonlinear optical coefficient ($\chi^{(2)}$) was measured at a fundamental wavelength of 1.064 $\mu$m. As a result, values of the copolymers 5, 6, and 7 were $8.1 \times 10^{-8}$ esu, $7.2 \times 10^{-8}$ esu, and $8.6 \times 10^{-8}$ esu, respectively.

Subsequently, a 6.0-$\mu$m thick film consisting of each of the copolymers 5, 6, and 7 was formed on a 100-$\mu$m thick polyimide film. Electrodes corresponding to a waveguide shape having a width of 100 $\mu$m was formed on the upper and lower surfaces of this two-layered film, and an electric field of 1.5 MV/cm was applied to the resultant structure at an atmospheric temperature of 140° C. The atmospheric temperature was decreased at a rate of 5° C./min, and the electric field was continuously applied until the temperature became 40° C. or less. After the electric field was disconnected, it was confirmed by refractive index measurement using a prism coupler that a refractive index of TM-mode light in a portion on which the electrode was mounted was increased by about 1.0% from that in a non-irradiated portion. As a result, a core portion having a size of 100 $\mu$m $\times$ 6.0 $\mu$m was formed. The same type of a polyimide film as the substrate was adhered on the waveguide film obtained as described above to constitute an optical waveguide device as shown in FIG. 2. The end faces of the device were optically polished, and a 1.064-nm YAG laser (power=80 mW) was incident on the core portion by direct coupling with the end face of a single-mode optical fiber. As a result, a 532-nm green second harmonic (SH) wave from the opposite core end face was observed. Table 6 shows a transmission loss of each optical waveguide and its conversion efficiency from the fundamental wave to the SH wave.

TABLE 5

| Material No. | Optical nonlinear material content (mol %) | Solubility (% w/w) | Film thickness ($\mu$m) | Film thickness variation (%/cm$^2$) |
|---|---|---|---|---|
| 5 | 50 | 14 | 6 | 0.4 |
| 6 | 55 | 22 | 15 | 0.4 |
| 7 | 60 | 21 | 13 | 0.3 |

TABLE 6

| Material No. | Transmission loss (dB/cm) | Conversion efficiency (%) |
|---|---|---|
| 5 | 1.1 | 10 |
| 6 | 1.0 | 11 |
| 7 | 1.0 | 9 |

COMPARATIVE EXAMPLE 2

A copolymer 8 presented below was synthesized following the same procedures as for the compound 1. Film formation was performed from a chlorobenzene solution by the spin coating method. A solubility in chlorobenzene, a film thickness obtained by spin coating of one step, and a corresponding film thickness variation were as shown in Table 7.

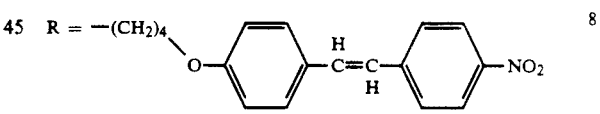

A film consisting of the copolymer 8 was formed on a glass substrate by the spin coating method. The resultant structure was sandwiched between counter electrodes as shown in FIG. 1 and applied with an electric field of 1.5 MV/cm at an atmospheric temperature of 140° C. The atmospheric temperature was decreased at a rate of 5° C./min, and the electric field was continuously applied until the temperature became 40° C. or less. After the electric field was disconnected, the sample was removed from the electrodes, and its second-order nonlinear optical coefficient ($\chi^{(2)}$) was measured at a fundamental wavelength of 1.064 $\mu$m. As a result, the $\chi^{(2)}$ value was $7.5 \times 10^{-8}$ esu.

Subsequently, a 1.5-$\mu$m thick film consisting of the copolymer 8 was formed on a 100-$\mu$m thick polyimide film. Electrodes corresponding to a waveguide shape having a width of 100 $\mu$m were formed on the upper and lower surfaces of this two-layered film, and an electric field of 1.5 MV/cm was applied to the resultant structure at an atmospheric temperature of 140° C. The atmospheric temperature was decreased at a rate of 5° C./min, and the electric field was continuously applied until the temperature became 40° C. or less. After the electric field was disconnected, it was confirmed by refractive index measurement using a prism coupler that a refractive index of TM-mode light in a portion on which the electrode was mounted was increased by about 1.0% from that in a non-irradiated portion. As a result, a core portion having a size of 100.0 μm×6.0 μm was formed. The same type of a polyimide film as the substrate was adhered on the waveguide film obtained as described above to constitute an optical waveguide device as shown in FIG. 2. The end faces of the device were optically polished, and a 1.064-nm YAG laser (power=80 mW) was incident on the core portion Sc by direct coupling with the end face of a single-mode optical fiber. As a result, since a coupling efficiency was very low, a 532-nm green second harmonic (SH) wave from the opposite core end face was 1/100 or less that obtained in Example 2.

Subsequently, a 1.5-μm thick film consisting of the compound 8 was formed on a 100-μm thick polyimide film by repeating spin coating four times or more. Electrodes corresponding to a waveguide shape having a width of 100 μm were formed on the upper and lower surfaces of this two-layered film, and an electric field of 1.5 MV/cm was applied to the resultant structure at an atmospheric temperature of 140° C. The atmospheric temperature was decreased at a rate of 5° C./min, and the electric field was continuously applied until the temperature became 40° C. or less. After the electric field was disconnected, it was attempted to confirm by refractive index measurement using a prism coupler that a refractive index of TM-mode light in a portion on which the electrode was mounted was increased from that in a non-irradiated portion. However, a film thickness variation was as too large as 35%/cm² to make the confirmation. The same type of a polyimide film as the substrate was adhered on the waveguide film obtained as described above to constitute an optical waveguide device as shown in FIG. 2. The end faces of the device were optically polished, and a 1,064-nm YAG laser (power=80 mW) was incident on the core portion by direct coupling with the end face of a single-mode optical fiber. As a result, a 532-nm green second harmonic (SH) wave from the opposite core end face was observed. However, since a transmission loss of the waveguide film was very large, a conversion efficiency of emerged light from the core end face was at most about 1/500 that obtained in Example 2. Table 8 shows a transmission loss of each optical waveguide and its conversion efficiency from the fundamental wave to the SH wave.

TABLE 7

| Material No. | Optical non-linear material content (mol %) | Solubility (% w/w) | Film thickness (μm) | Film thickness variation (%/cm²) |
|---|---|---|---|---|
| 8 | 50 | 7 | 1.5 | 21 |

TABLE 8

| Material No. | Transmission loss (dB/cm) | Conversion efficiency (%) |
|---|---|---|
| 8 | 27 | 0.02 |

EXAMPLE 3

Copolymers 9 to 17 presented below were synthesized. Synthesizing methods of the copolymers 10, 14, and 17 will be described below. The copolymers 9 to 11, 12 to 14, and 15 to 17 were synthesized following the same procedures as for the copolymers 10, 14, and 17, respectively.

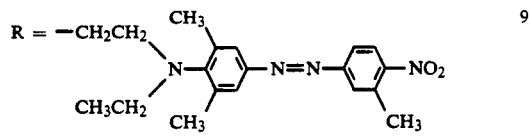

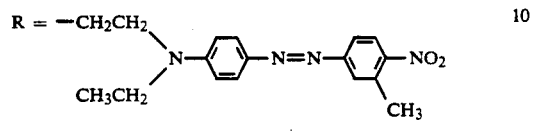

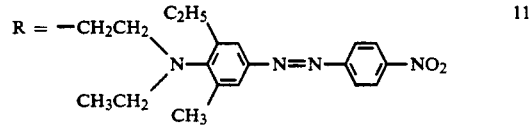

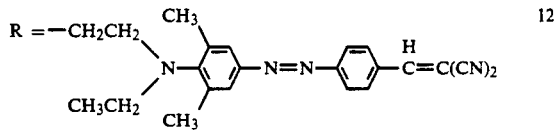

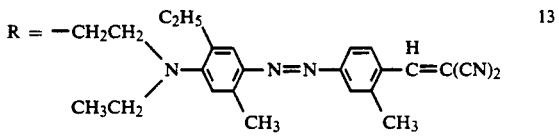

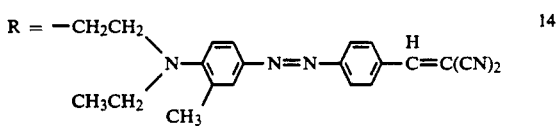

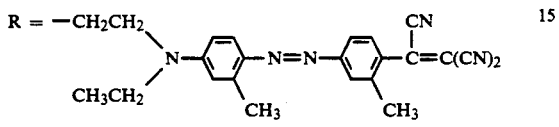

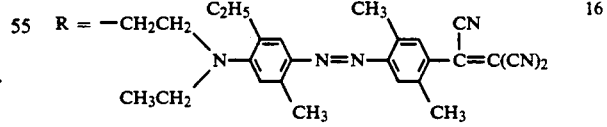

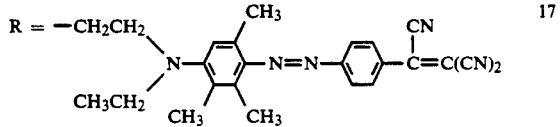

The basic structure of the copolymers 9 to 17 was as follows:

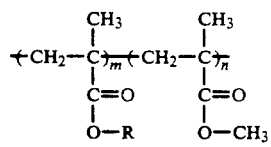

Copolymer 10

Methacryloyl chloride and (N-ethyl)anilinoethanol were reacted with each other in dry tetrahydrofuran at room temperature for 24 hours in the presence of triethylamine. After the reaction, the reaction mixture was mixed with water, and the reaction product was extracted by diethylether and purified through a silica gel column to obtain a compound D.

The compound D was mixed with methylmethacrylate at a ratio of m to n, and azobisisobutyronitrile was mixed in an amount corresponding to a 1 mol % of the resultant mixture. After dissolved oxygen was removed by repeating a cycle of freezing-deaeration-dissolution, the resultant material was encapsulated in an ampoule and polymerized at 65° C. for 24 hours. After the reaction, the polymer was dissolved in chloroform, and reprecipitation was done by methanol to purify the resultant material, thereby obtaining copolymer E.

Subsequently, 3-methyl-4-nitroaniline was dissolved in acetic acid, and sodium nitrite dissolved in sulfuric acid was added to the resultant solution while the liquid temperature was maintained at lower than 20° C. An equimolar amount of $KPF_6$ was added to the resultant solution, and a separated precipitation was collected and washed with distilled water to obtain a copolymer F.

An acetic acid solution of the copolymer E was added to an acidic acid solution of the copolymer F, and sodium acetate in an amount of two-equivalent weight of the copolymer F was added to the resultant solution. The reaction mixture was then allowed to react at room temperature for 24 hours. After the reaction, the reaction mixture was added to methanol to obtain the copolymer 10 by reprecipitation.

Copolymer 12

A copolymer G was synthesized following the same procedures as for the copolymer E. Subsequently, aminobenzaldehyde extracted from a commercially available aminobenzaldehyde monomer by diethylether and malononitrile were reacted with each other under reflux with heat for two hours in anhydrous ethanol using piperidine dissolved in acetic acid as a catalyst. After the reaction, the resultant solution was cooled, and a precipitated solid was collected and recrystallized from ethanol to obtain a copolymer H. The compound H was subjected to diazotization and coupling with the copolymer G following the same procedures as in synthesis of the copolymer 10, thereby obtaining the copolymer 12.

Copolymer 17

The copolymer H was dispersed in an aqueous ethanol solution and reacted with sodium cyanide to obtain a copolymer I. The copolymer I was oxidized by bromine to obtain a copolymer J. Synthesis of a copolymer K was performed following the same procedures as for the copolymers E and G. Subsequently, the copolymer J was subjected to diazotization and coupling with the copolymer K following the same procedures as for the copolymers 10 and 14, thereby obtaining the copolymer 17.

Film formation was performed from a methyl cellosolve acetate solution by the spin coated method. A solubility in the solvent, a film thickness obtained by spin coating of one step, and a corresponding film thickness variation were as shown in Table 9.

Figure 5:
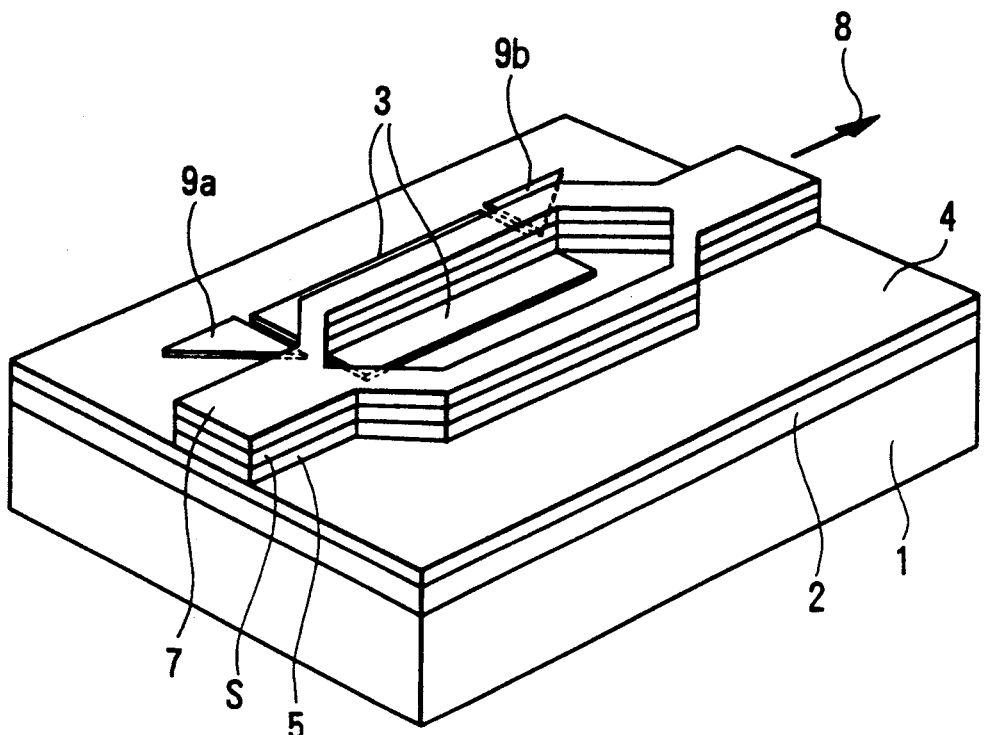
FIG. 5 is a perspective view showing a structure of a channel waveguide having a pattern of a Mach Zehnder interferometer.

Subsequently, as shown in FIGS. 4A to 4D, a coplanar-waveguide type gold electrode 3 was formed by a plating method on a silicon substrate 1 on which glass 2 consisting of CORNING 7059 (borosilicate glass) (tradename: available from Corning Glass Works) as multi-component glass was formed by sputtering, and OMR-83 (negative type Resist) (tradename: available from TOKYO OHKA KOGYO, CO., LTD.) as a negative resist 4 was buried in a recess portion near the electrode to flatten the recess. After PVA (polyvinyl alcohol) was coated on the resultant structure to form a lower cladding layer 5, a 6.0-μm thick film consisting of each of the compounds 9 to 17 was coated by the spin coating method. The resultant silicon substrate having this polymer thin film was sandwiched between electrodes as shown in FIG. 1, and the polymer portion was subjected to a poling treatment. Thereafter, a photosensing resin was coated, and ultraviolet light was radiated to form an upper cladding layer. A positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 2.0 to 3.0 V. An extinction ratio of a signal was 18 to 20 dB. These results and a transmission loss of the manufactured waveguide are shown in Table 10.

Note that in FIG. 5, the same reference numerals as in FIG. 4 denote the same part. Referring to FIG. 5, reference numeral 7 denotes an upper cladding layer; 8, laser light; and 9a and 9b, an electrode for modulation signal input and an electrode for modulation signal output, respectively.

Synthesis of Copolymer 10

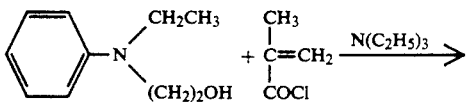

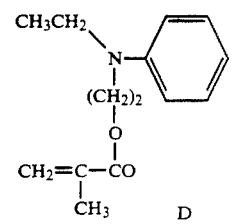

-continued
Synthesis of Copolymer 10

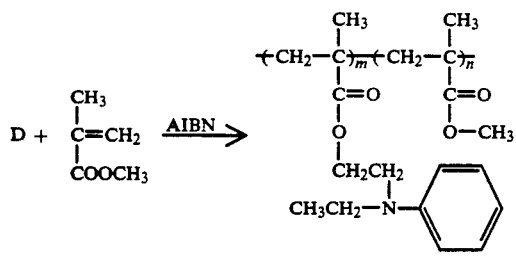

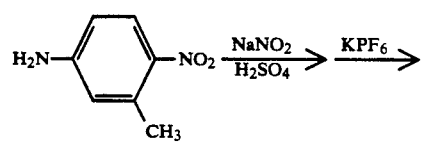

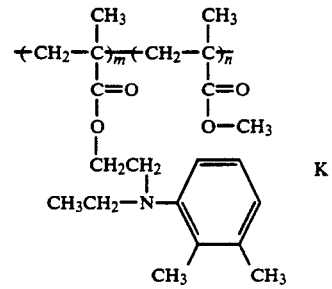

F + E ⟶ Copolymer 10

Synthesis of Copolymer 12

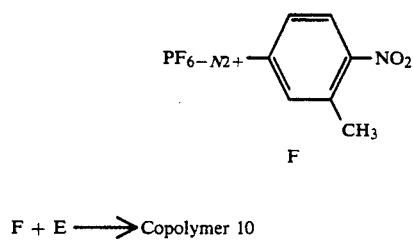
G

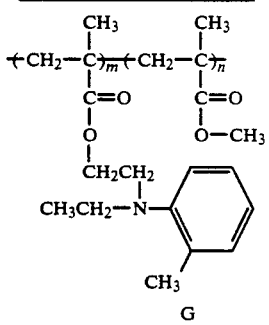

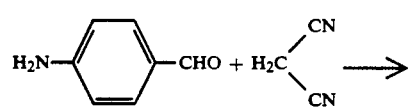
H

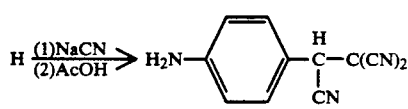
I

-continued
Synthesis of Copolymer 12

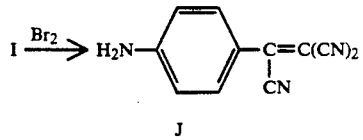
J

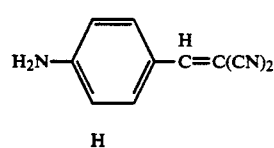
K

TABLE 9

| Material No. | Optical nonlinear material content (mol %) | Solubility (% w/w) | Film thickness (μm) | Film thickness variation (%/cm²) |
|---|---|---|---|---|
| 9 | 40 | 25 | 11 | 0.5 |
| 10 | 35 | 15 | 8 | 0.4 |
| 11 | 45 | 21 | 9 | 0.3 |
| 12 | 38 | 18 | 12 | 0.3 |
| 13 | 41 | 23 | 11 | 0.4 |
| 14 | 29 | 13 | 8 | 0.3 |
| 15 | 33 | 19 | 10 | 0.4 |
| 16 | 44 | 22 | 11 | 0.4 |
| 17 | 42 | 19 | 11 | 0.4 |

TABLE 10

| Material No. | Transmission loss (dB/cm) | Drive voltage (V) | Extinction ratio (dB) |
|---|---|---|---|
| 9 | 1.1 | 2.0 | 18 |
| 10 | 1.0 | 2.5 | 20 |
| 11 | 1.0 | 2.2 | 20 |
| 12 | 0.9 | 2.9 | 20 |
| 13 | 0.9 | 2.4 | 19 |
| 14 | 1.2 | 2.8 | 19 |
| 15 | 1.0 | 2.1 | 20 |
| 16 | 1.1 | 2.7 | 19 |
| 17 | 1.0 | 3.0 | 18 |

COMPARATIVE EXAMPLE 3

Copolymers 18 to 20 presented below were synthesized following the same procedures as for the copolymers 10, 14, and 17, respectively. Film formation was performed from a cellosolve acetate solution by the spin coating method. A solubility in the solvent, a film thickness obtained by spin coating of one step, and a corresponding film thickness variation were as shown in Table 11.

Subsequently, as shown in FIGS. 4A to 4D, a coplanar-waveguide type gold electrode 3 was formed by a plating method on a silicon substrate 1 on which glass 2 consisting of CORNING 7059 (tradename: available from Corning Glass Works) as multi-component glass was formed by sputtering, and OMR-83 (tradename: available from TOKYO OHKA KOGYO CO., LTD.) as a negative resist 4 was buried in a recess portion near the electrode to flatten the recess. After polyvinyl alcohol was coated on the resultant structure to form a lower cladding layer 5, a 1.0-μm thick film consisting of each of the copolymers 18 to 20 was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 2.0 to 3.0 V. However, since a coupling efficiency of incident light was very low, an extinction ratio of a signal was about 1/40 that obtained in Example 3.

Subsequently, in the manufacture of the above Mach Zehnder interferometer, 6.0-μm thick film consisting of each of the compounds 18 to 20 was formed by repeating spin coating four times or more. End face polishing was performed for the waveguide, and laser light having a wavelength of 1.3 μm was directly coupled to the waveguide using a single-mode fiber. As a result, optical modulation was able to be performed by a drive voltage of 2.0 to 3.0 V. However, a transmission loss of the waveguide layer and a film thickness variation (35%/cm$^2$) were much larger than those obtained in Example 3, and an extinction ratio of a signal was about 1/100 that obtained in Example 3.

TABLE 11

| Material No. | Optical nonlinear material content (mol %) | Solubility (% w/w) | Film thickness (μm) | Film thickness variation (%/cm$^2$) |
|---|---|---|---|---|
| 18 | 35 | 7 | 1.5 | 15 |
| 19 | 38 | 5 | 1.2 | 10 |
| 20 | 31 | 6 | 1.4 | 11 |

The basic structure of the copolymers 18 to 20 was as follows:

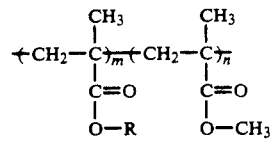

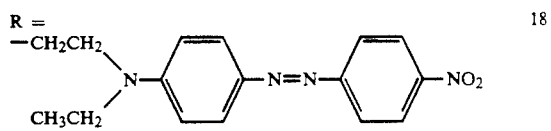

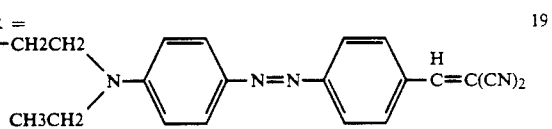

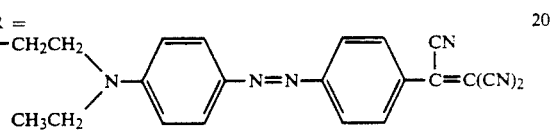

EXAMPLE 4

Copolymers 21 to 32 were synthesized. Synthesis of the copolymers 21 and 30 was performed as follows. The remaining copolymers were synthesized following the same procedures as for the copolymers 21 and 30 and in Example 3.

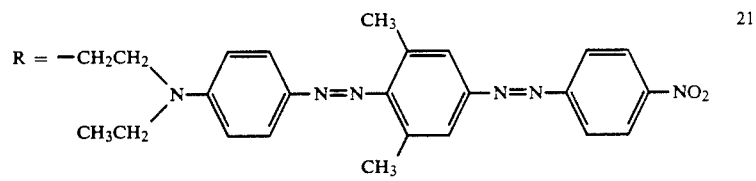

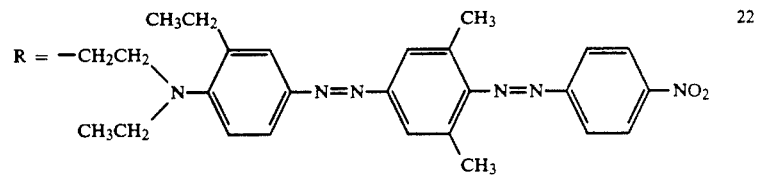

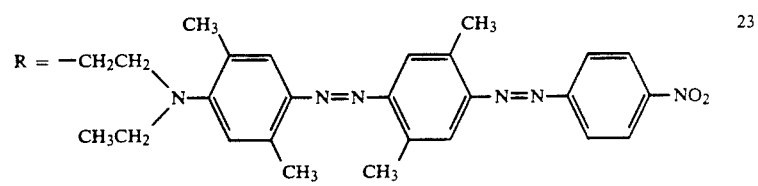

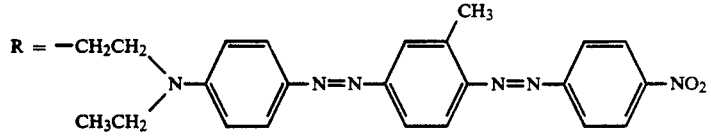
24
The basic structure of the copolymers 21 to 24 was as follows:
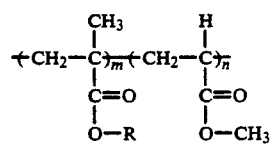
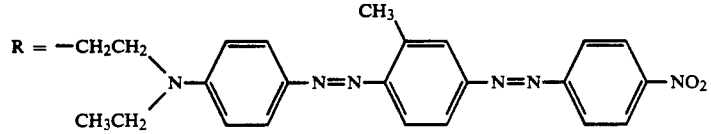
25
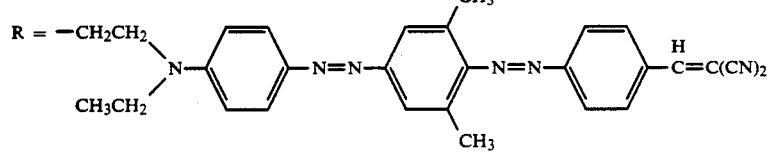
26
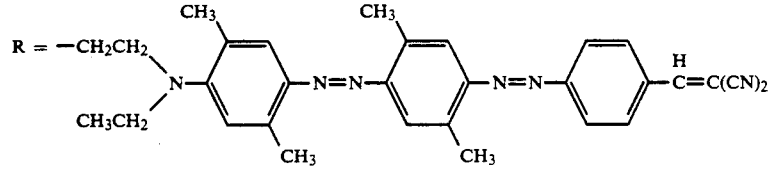
27
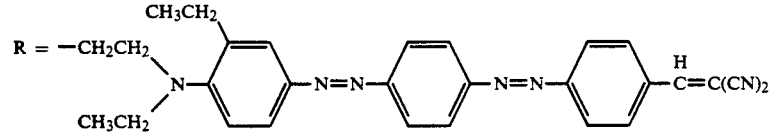
28
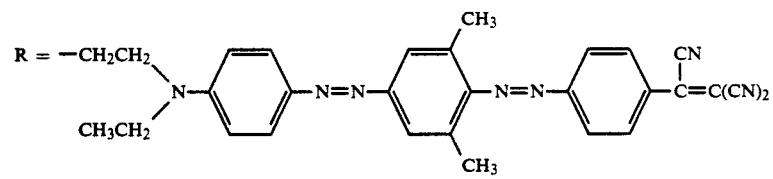
29
Note that the basic structure of the copolymers 25 to 29 was as follows:
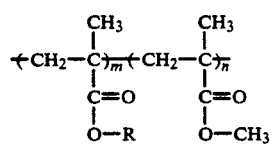
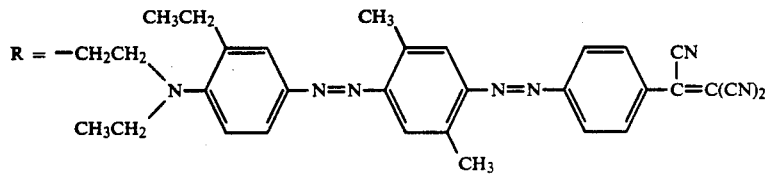
30

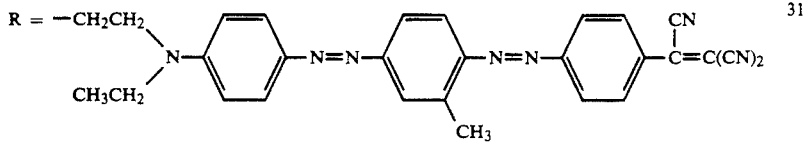

31

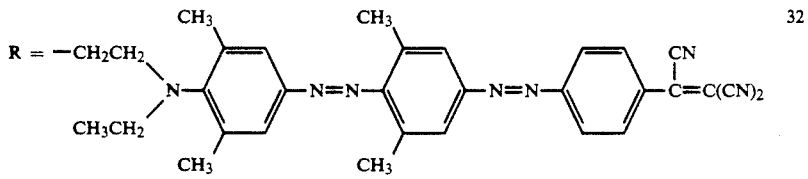

32

Note that the basic structure of the copolymers 30 to 32 was as follows:

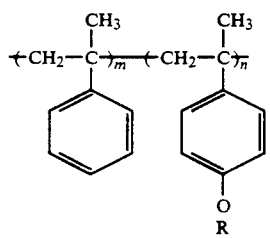

Copolymer 21

A copolymer N was synthesized following the same procedures as for the copolymers E and G. P-nitroaniline was subjected to diazotization following the same procedures as in Example 3 to obtain a copolymer K. The copolymer K and 2,6-xylidine were subjected to diazocoupling in acetic acid by adding a two-equivalent weight of sodium acetate to obtain a copolymer L. The copolymer L was subjected to diazotization and coupled with the copolymer N to obtain the copolymer 21.

Copolymer 30

A copolymer P was synthesized following the same procedures as for the copolymer 21 through a diazocoupling reaction of two steps. Subsequently, the copolymer P was reacted with toluene sulfonic chloride in an anhydrous solvent to obtain a copolymer Q. The copolymers O and Q were reacted with each other in the presence of KOH to obtain the copolymer 30.

Copolymer 26

Synthesis of Compound Z 170 g of (N-ethyl)anilinoethanol (Tokyo Kasei K.K.) were dissolved in 1,000 cc of anhydrous tetrahydrofuran (dried by molecular sieves), and the resultant solution was dried by anhydrous magnesium sulfate. The resultant material together with 300 g of triethylamine dried by molecular sieves was poured in a 3,000-cc three-neck flask having a calcium chloride tube, a dropping funnel, and a reflux tube, and 105 g of methacryloyl chloride (aldrich: added with a stabilizer) were dropped therein for one or more hours under stirring. The resultant material was further stirred at room temperature for 24 hours and heated under reflux for one hour. After the reaction, 2,000 cc of water were added to the resultant material, and the material was neutralized by hydrochloric acid. The product was extracted by diethylether and dried by magnesium sulfate, and ether was distilled off to obtain a compound Z (yield=200 g).

Synthesis of Copolymer Y 50 g of the compound Z, 50 g of methylmethacrylate (Tokyo Kasei K.K.) purified by distillation, and 0.1 g of 2,2'-azobis(isobutyronitrile) (Tokyo Kasei K.K.) were poured in a glass ampoule, and a cycle of freezing-deaeration-dissolution was repeated three times at a reduced pressure. The resultant material was encapsulated in a vacuum and polymerized at 65° C. for 24 hours. After the reaction, the polymer (copolymer Y) was dissolved in 500 cc of acetic acid, reprecipitated from 2,000 cc of methanol, and then purified (yield=80 g). Molecular weights were $Mn=21,000$ and $Mw=71,000$. A methylmethacrylate present ratio in the copolymer Y was determined to be 28 mol % by an NMR spectrum.

Synthesis of Compound X 20 g of a p-aminobenzaldehyde monomer (Tokyo Kasei K.K.) (containing 50% of a homopolymer), 5.5 g of malonitrile (Tokyo Kasei K.K.), and 500 cc of anhydrous ethanol (dried by molecular sieves) were poured in a three-neck flask having a calcium chloride tube, a dropping funnel, and a reflux tube and stirred to obtain a suspension. A solution prepared by dissolving 2.0 cc of piperidine (Tokyo Kasei K.K.) in 7 cc of acetic acid was dropped in the suspension, and the resultant suspension was heated under reflux for two hours. After the reaction, ethanol was distilled off, and the reaction product was extracted by diethylether. A portion insoluble in ether was removed (which was assumed to be a nonreacted p-aminobenzaldehyde monomer). The ether extracted component was recrystallized from ethanol to obtain a compound X (yield=38%).

Synthesis of Compound XX 20 g of the compound X were dissolved in 500 cc of acetic acid with heat and cooled to a temperature of 10° C. or less. 9.9 g of sodium sulfite were gradually added to and dissolved in 200 cc of sulfuric acid so as not to generate heat. The resultant solution was dropped in the above acetic acid solution of the compound X so that the liquid temperature did not exceed 10° C. Subsequently, the reaction solution was cooled to a temperature of 10° C. or less, and an aqueous solution prepared by dissolving 29 g of potassium hexafluorophosphorate (Kanto Kagaku K.K.) in a small amount of water was added to the cooled solution. The resultant solution was stirred for about 15 minutes. A separated precipitation was collected through a glass filter, washed with a small amount of acetic acid, and stored (a compound XX).

Synthesis of compound YY

The compound XX was dissolved in 500 cc of acetic acid cooled to a temperature of about 15° C., and 12 g of 3,5-xylidine and 27 g of sodium acetate were added to the solution. The reaction solution was immediately colored with dark red. The reaction solution was stirred at about 15° C. for several hours and further reacted at room temperature for 12 hours. After the reaction, 2,000 cc of water were added to the reaction solution to precipitate the reaction product. This precipitation was sufficiently dried by a vacuum dryer and purified through a silica gel column (flowed out by methylene chloride) (yield=15 g).

Synthesis of Copolymer 26

7 g of the compound YY and 10 g of the compound Z were reacted following the same procedures as for the compounds XX and YY to obtain a copolymer 26. Purification was performed by reprecipitation using methanol following the same procedures as for the compound Z.

Film formation was performed from a methylcellosolve acetate solution by the spin coating method. A solubility in the solvent, a film thickness obtained by spin coating of one step, and a corresponding film thickness variation were as shown in Table 12.

Subsequently, a coplanar-waveguide type (CPW) gold electrode was formed by a plating method on a silicon on which CORNING 7059 glass (tradename: available from Corning Glass Works) was formed by sputtering, and OMR-83 (available from TOKYO OHKA KOGYO CO., LTD.) as a negative resist was buried in a recess portion near the electrode to flatten the recess. After poly(methylmethacrylate) was coated on the resultant structure to form a lower cladding layer, a 6.0-μm thick film consisting of each of the copolymers 21 to 32 was coated by the spin coating method. PVA was coated on the film to form an upper cladding layer, and MICROPOSIT S1400-27 (positive type Resist) (tradename: available from Shipley Ear East Co.) as a positive resist was heated at 195° C. for about one hour to form a hard coat layer. A silicon-based positive resist was coated on the hard coat layer, and a mask was overlapped such that a waveguide pattern was placed on a central conductor of the electrode. Thereafter, the resultant structure was exposed with ultraviolet ray and developed. The organic thin film layer except for the waveguide pattern portion was removed by reactive ion etching using oxygen gas. In addition, a thin film of oxidized silicon formed on the surface was removed by a fluoric acid buffer solution, and the silicon-based positive resist was removed by an alkali solution. Thereafter, reactive ion etching using oxygen gas was performed again to remove the hard coat layer, thereby manufacturing a channel waveguide having a pattern of the Mach Zehnder interferometer as shown in FIG. 4. The silicon substrate having this polymer thin film was sandwiched between electrodes as shown in FIG. 1, and the polymer portion was subjected to a poling treatment. End face polishing was performed for the waveguide, and laser light having a wavelength of 1.3 μm was directly coupled to the waveguide using a single-mode fiber. As a result, optical modulation was able to be performed by a drive voltage of 1.5 to 2.0 V. An extinction ratio of a signal was 18 to 20 dB. An electrooptical constant of these materials was 160 to 220 pm/V. These results and a transmission loss of the manufactured waveguide are shown in Table 13.

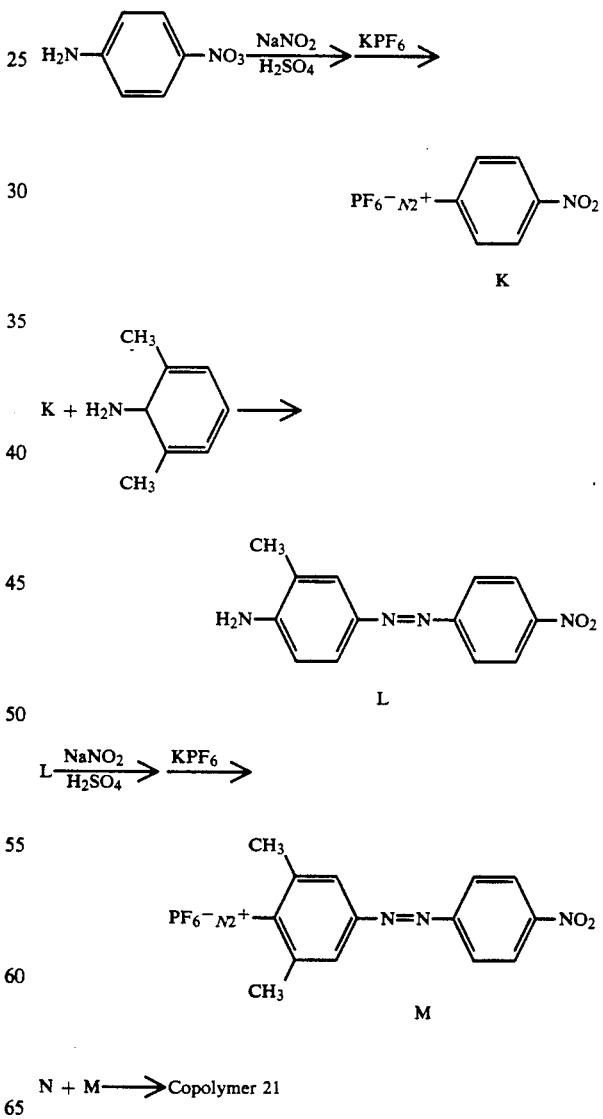

Note that the copolymer N had the following structure:

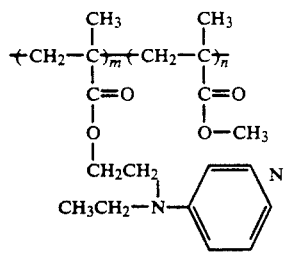
Synthesis of Copolymer 30
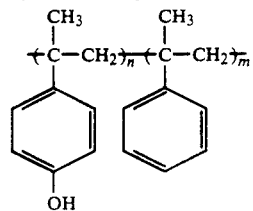   O
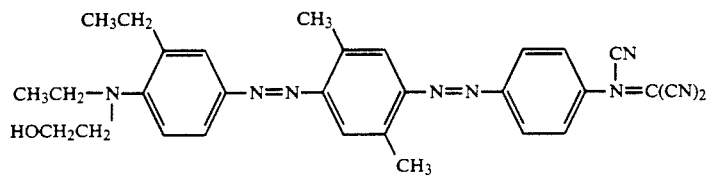   P
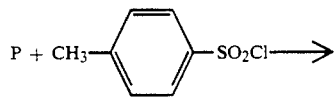
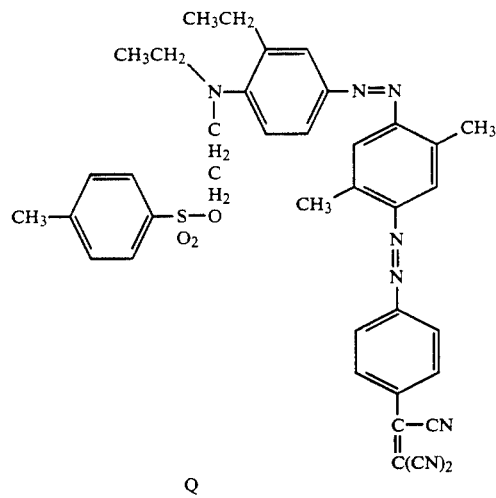
Q
O + Q ⟶ Copolymer 30
Synthesis of Copolymer 26
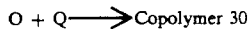
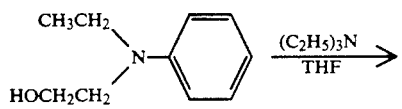

-continued
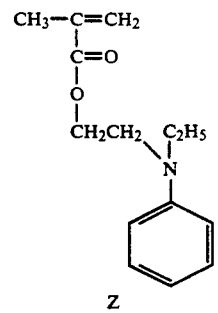
Z
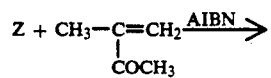
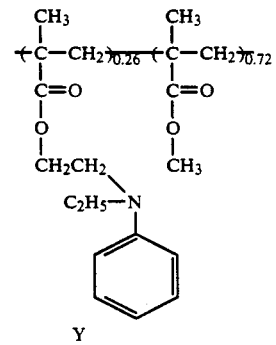
Y
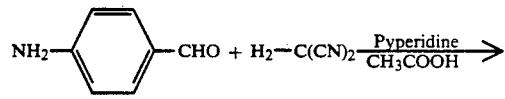
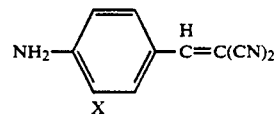
X
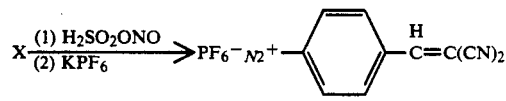
XX
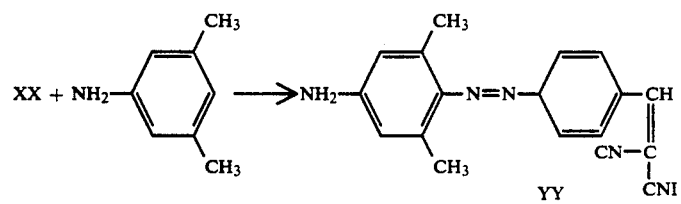
YY
TABLE 12
| Material No. | Optical nonlinear material content (mol %) | Solubility (% w/w) | Film thickness (μm) | Film thickness variation (%/cm²) |
|---|---|---|---|---|
| 21 | 30 | 15 | 7 | 0.5 |
| 22 | 35 | 17 | 8 | 0.4 |
| 23 | 35 | 19 | 8 | 0.3 |
| 24 | 20 | 13 | 6 | 0.3 |
| 25 | 20 | 12 | 6 | 0.4 |
| 26 | 25 | 18 | 8 | 0.3 |
| 27 | 30 | 17 | 8 | 0.4 |
| 28 | 25 | 13 | 6 | 0.4 |
| 29 | 30 | 17 | 8 | 0.4 |
| 30 | 50 | 20 | 10 | 0.5 |
| 31 | 50 | 15 | 8 | 0.4 |
| 32 | 50 | 18 | 9 | 0.4 |

TABLE 13

| Material No. | Transmission loss (dB/cm) | Drive voltage (V) | Extinction ratio (dB) | Electrooptical constant (pm/V) |
|---|---|---|---|---|
| 21 | 1.1 | 2.0 | 18 | 160 |
| 22 | 1.0 | 2.1 | 20 | 170 |
| 23 | 1.0 | 2.0 | 20 | 165 |
| 24 | 0.9 | 2.1 | 20 | 160 |
| 25 | 0.9 | 2.0 | 19 | 160 |
| 26 | 1.2 | 1.8 | 19 | 180 |
| 27 | 1.0 | 1.7 | 20 | 188 |
| 28 | 1.1 | 1.8 | 19 | 185 |
| 29 | 1.0 | 1.6 | 18 | 200 |
| 30 | 1.1 | 1.5 | 20 | 220 |
| 32 | 1.0 | 1.6 | 19 | 215 |
| 33 | 1.0 | 1.5 | 20 | 210 |

COMPARATIVE EXAMPLE 4

Copolymers 33 to 35 were synthesized following the same procedures as described above. Film formation was performed from a cellosolve acetate solution by the spin coating method. A solubility in the solvent, a film thickness obtained by spin coating of one step, and a corresponding film thickness variation were as shown in Table 14.

In the manufacture of a channel waveguide having a pattern of the Mach Zehnder interferometer described above, a 1.0 -μm thick film consisting of each of the copolymers 33 to 35 was coated by the spin coating method. End face polishing was performed for the waveguide, and laser light having a wavelength of 1.3 μm was directly coupled to the waveguide using a single-mode fiber. As a result, since a coupling efficiency of incident light was very low, no modulation signal could be found.

Subsequently, in the manufacture of the above Mach Zehnder interferometer, a 6.0-μm thick film consisting of each of the copolymers 33 to 35 was formed by repeating spin coating four times or more. End face polishing was performed for the waveguide, and laser light having a wavelength of 1.3 μm was directly coupled to the waveguide using a single-mode fiber. As a result, since a waveguide loss (70 dB/cm) and a film thickness variation (35%/cm$^2$) were very large, no modulation signal could be observed.

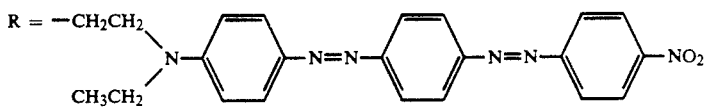

Note that the basic structure of the copolymer 33 was as follows:

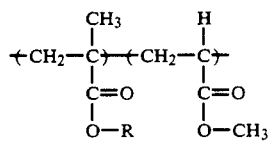

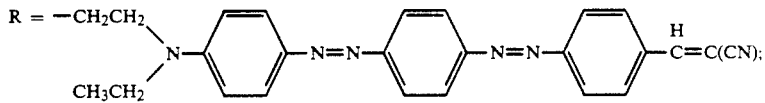

Note that the basic structure of the copolymer 34 was as follows:

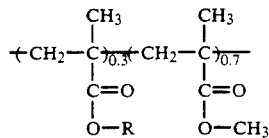

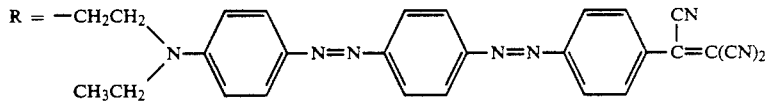

Note that the basic structure of the copolymer 35 was as follows:

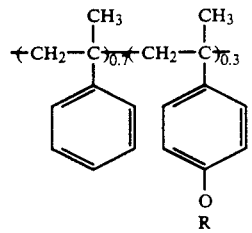

TABLE 14

| Material No. | Optical nonlinear material content (mol %) | Solubility (% w/w) | Film thickness (μm) | Film thickness variation (%/cm$^2$) |
|---|---|---|---|---|
| 33 | 30 | 4 | 0.3 | 25 |
| 34 | 30 | 3 | 0.4 | 30 |
| 35 | 30 | 3 | 0.3 | 33 |

EXAMPLE 5
Copolymers 36 to 47 were synthesized. Synthesis of the copolymer 36 was performed as follows. The remaining compounds were synthesized following the same procedures as for the copolymer 36.
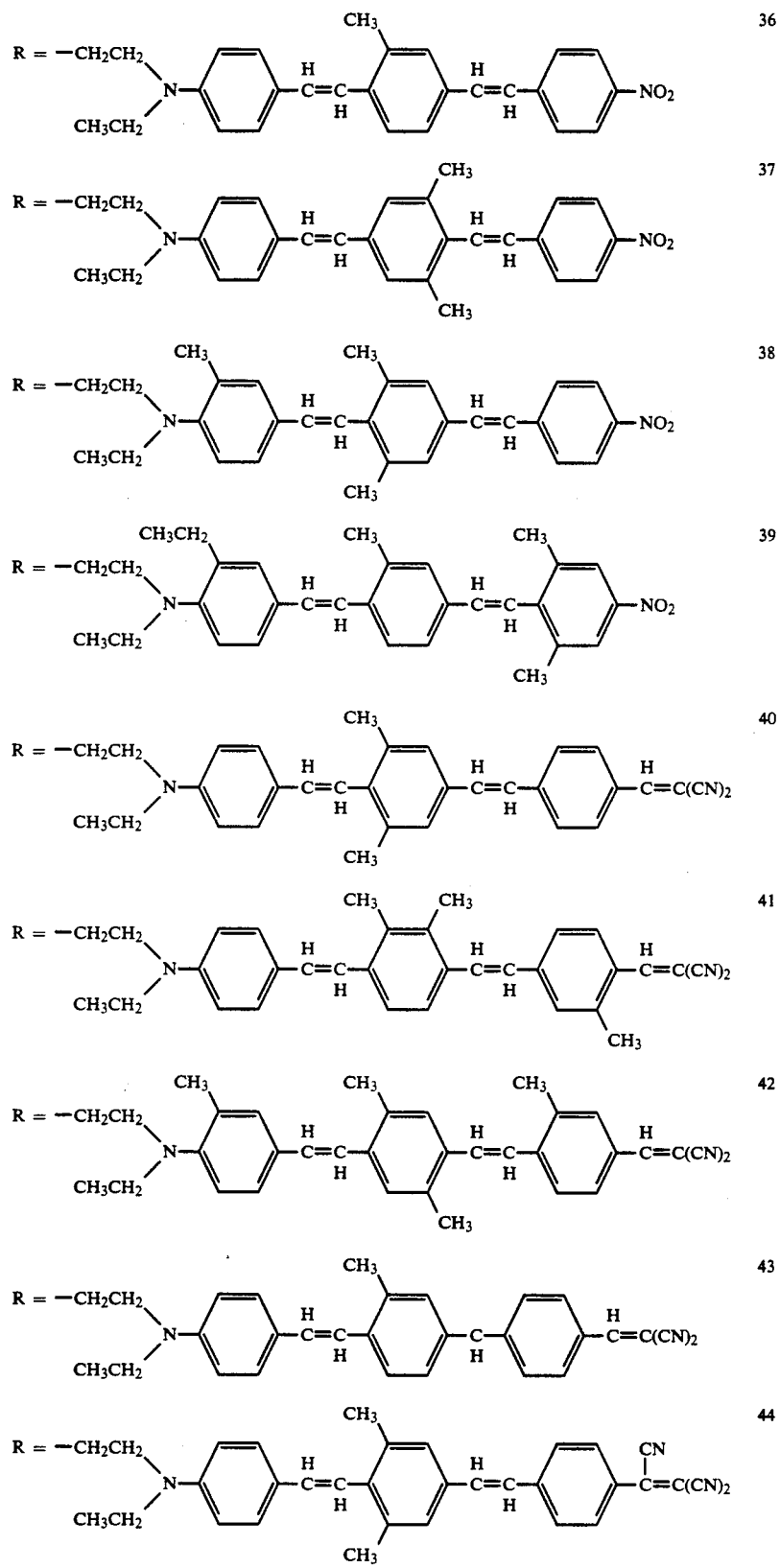

-continued

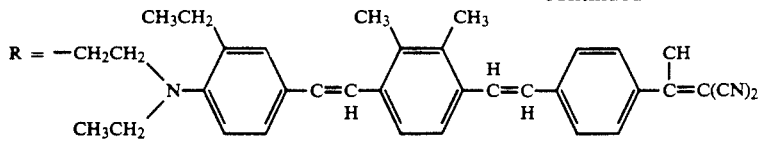

45

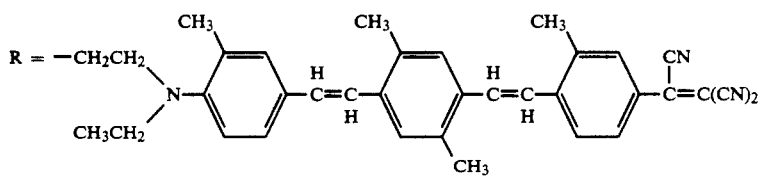

46

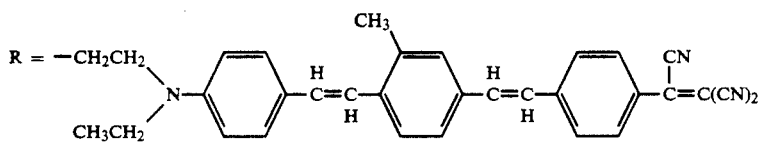

47

Note that the basis structure of the copolymers 36 to 47 was as follows:

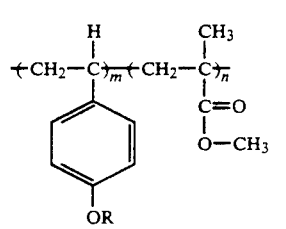

Synthesis of Compound 36

A compound U was synthesized by a method described in a reaction formula to be presented below. Compound R is the copolymer of p-hydroxystyrene and methylmethacrylate. The compound U and copolymer R were reacted with each other following the same procedures as in Example 4 to obtain the copolymer 36.

Film formation was performed from a tetrahydrofuran solution by the spin coating method. A solubility in the solvent, a film thickness obtained by spin coating of one step, a corresponding film thickness variation, and a third-order optical nonlinear constant were as shown in Table 14A.

Subsequently, a 5.0-μm thick thin film was formed on a glass substrate by the spin coating method. A third-order nonlinear optical coefficient of the film was as shown in Table 14A. A mask having a 5.0-μm wide waveguide shape was overlapped on the resultant substrate, and the substrate was exposed by 100-W heavy hydrogen lamp for 15 minutes. After the mask was removed, it was confirmed that a refractive index in a portion irradiated with ultraviolet rays was decreased to be smaller than that in a non-irradiated portion. As a result, a core portion having a width of 5 μm was formed. The two end faces of the waveguide were polished, and aluminum was deposited thereon to manufacture an optical bistable device structure. A 1.06-μm YAG laser was incident on the aluminum-deposited end face using a single-mode optical fiber, and a transmitted light intensity was observed as a function of an incident light intensity. As a result, a hysteresis exhibiting optical bistability was confirmed at room temperature.

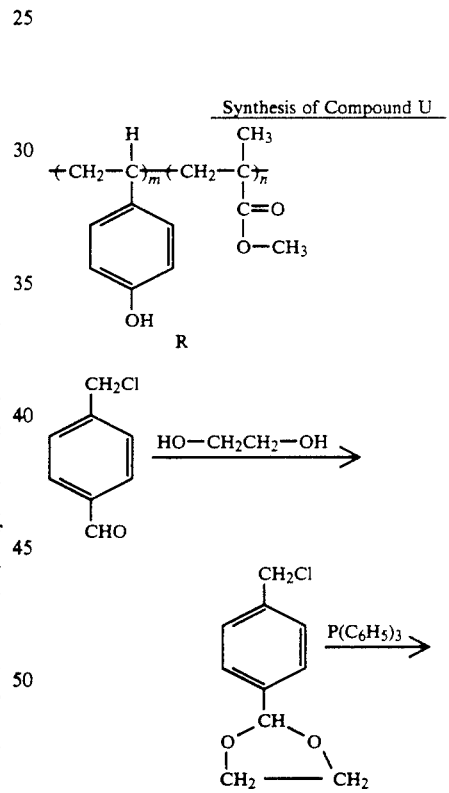

Synthesis of Compound U

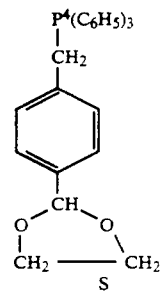

-continued
Synthesis of Compound U

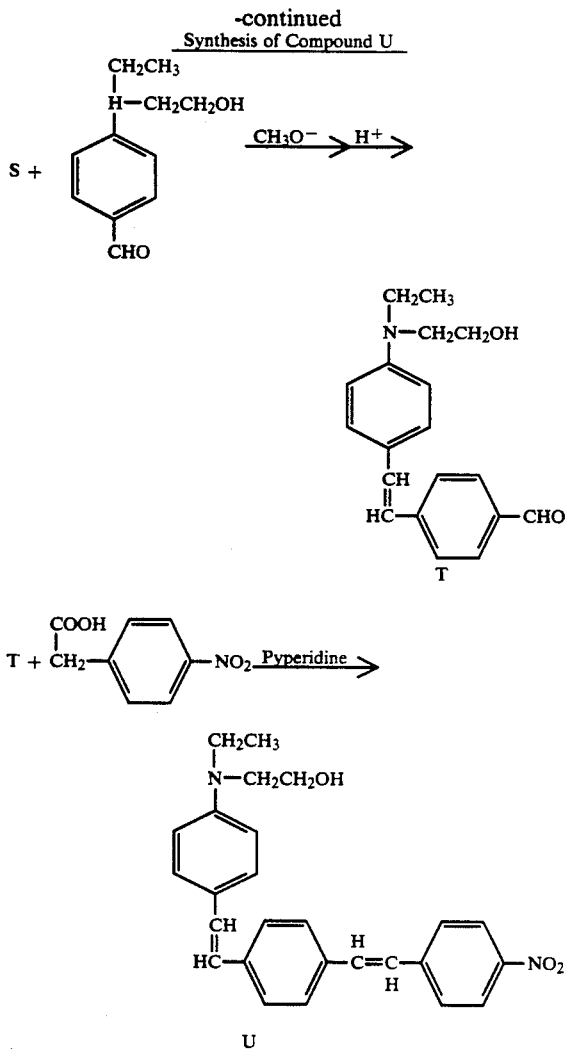

TABLE 14A

| Material No. | Optical nonlinear material content (mol %) | Solubility (% w/w) | Film thickness (μm) | Film thickness variation (%/cm²) | $\chi^{(3)} \times 10^{-11}$ (esu) |
|---|---|---|---|---|---|
| 36 | 20 | 15 | 7 | 0.3 | 5.1 |
| 37 | 23 | 17 | 8 | 0.3 | 4.8 |
| 38 | 25 | 18 | 9 | 0.3 | 4.1 |

TABLE 14A-continued

| Material No. | Optical nonlinear material content (mol %) | Solubility (% w/w) | Film thickness (μm) | Film thickness variation (%/cm²) | $\chi^{(3)} \times 10^{-11}$ (esu) |
|---|---|---|---|---|---|
| 39 | 30 | 18 | 9 | 0.3 | 3.7 |
| 40 | 22 | 16 | 8 | 0.4 | 6.1 |
| 41 | 25 | 19 | 8 | 0.3 | 5.8 |
| 42 | 27 | 19 | 9 | 0.4 | 5.5 |
| 43 | 21 | 15 | 7 | 0.4 | 5.8 |
| 44 | 25 | 14 | 8 | 0.4 | 7.1 |
| 45 | 28 | 18 | 9 | 0.4 | 6.5 |
| 46 | 27 | 14 | 7 | 0.3 | 6.1 |
| 47 | 20 | 13 | 7 | 0.3 | 6.2 |

COMPARATIVE EXAMPLE 5

Copolymers 48 to 50 were synthesized following the same procedures as described above. Film formation was performed from a tetrahydrofuran solution by the spin coating method. A solubility in the solvent, a film thickness obtained by spin coating of one step, a corresponding film thickness variation, and a third-order optical nonlinear constant ($\chi^{(3)}$) were as shown in Table 15. Subsequently, a 5.0-μm thick thin film was formed on a glass substrate by the spin coating method. A mask having a 5.0-μm wide waveguide shape was overlapped on the resultant substrate, and the substrate was exposed by 100-W heavy hydrogen lamp for 15 minutes. After the mask was removed, it was confirmed that a refractive index in a portion irradiated with ultraviolet rays was decreased to be smaller than that in a non-irradiated portion. As a result, a core portion having a width of 5 μm was formed. The two end faces of the waveguide were polished, and aluminum was deposited thereon to manufacture an optical bistable device structure. A 1.06-μm YAG laser was incident on the aluminum-deposited end face using a single-mode optical fiber, and a transmitted light intensity was observed as a function of an incident light intensity. As a result, although a hysteresis exhibiting optical bistability was confirmed at room temperature, a signal intensity was 1/1,000 or less that obtained in Example 5. In addition, a film having a thickness of 1 μm or more was formed by repeating spin coating, and it was attempted to confirm an optical bistable operation as described above. However, since a film thickness precision and optical uniformity of film quality were significantly inferior to those obtained in Example 5, no hysteresis could be confirmed.

The basic structure of the copolymers 48 to 50 was as follows:

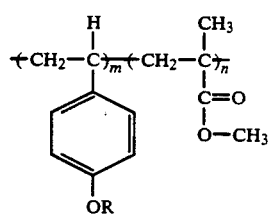

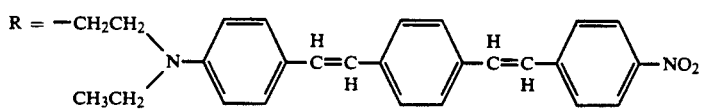

-continued

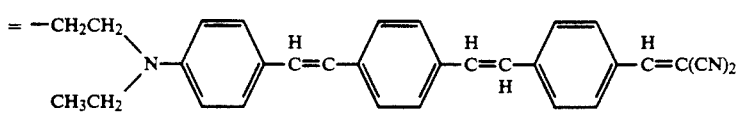
49

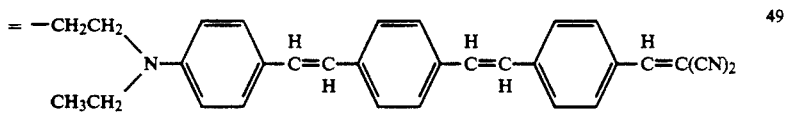
49

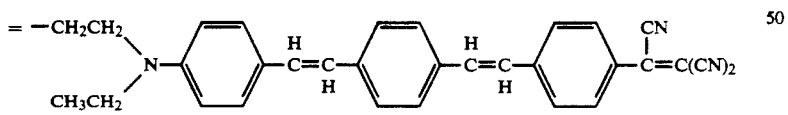
50

TABLE 15

| Material No. | Optical nonlinear material content (mol %) | Solubility (% w/w) | Film thickness (μm) | Film thickness variation (%/cm²) | $\chi^{(3)} \times 10^{-11}$ (esu) |
|---|---|---|---|---|---|
| 48 | 20 | 1 | 0.1 | 25 | 6.0 |
| 49 | 23 | 1 | 0.1 | 30 | 7.0 |
| 50 | 25 | 1 | 0.1 | 32 | 7.5 |

EXAMPLE 6

A copolymer 50A presented below was synthesized following the same procedures as in Example 4. The compound was dissolved in chlorobenzene at a concentration of 11% w/w, and a 5.0-μm thick thin film was formed on a glass substrate by the spin coating method. A third-order nonlinear optical coefficient of the film was $2 \times 10^{-8}$ esu. A mask having a 5.0-μm wide waveguide shape was overlapped on the resultant substrate, and the substrate was exposed by 100-W heavy hydrogen lamp for 15 minutes. After the mask was removed, it was confirmed that a refractive index in a portion irradiated with ultraviolet rays was decreased to be smaller than that in a non-irradiated portion. As a result, a core portion having a width of 5 μm was formed. The two end faces of the waveguide were polished, and aluminum was deposited thereon to manufacture an optical bistable device structure. A 1.06-μm YAG laser was incident on the aluminum-deposited end face using a single-mode optical fiber, and a transmitted light intensity was observed as a function of an incident light intensity. As a result, a hysteresis exhibiting optical bistability was confirmed at room temperature.

The basis structure of the copolymer 50A was as follows:

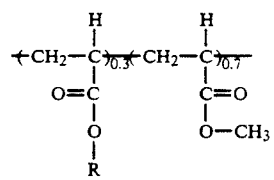

50A

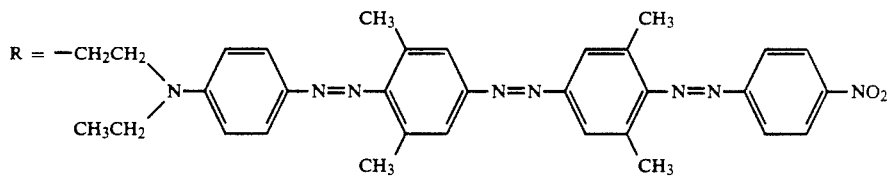

COMPARATIVE EXAMPLE 6

A copolymer 50B was synthesized following the same procedures as in Example 4. The copolymer could be dissolved in chlorobenzene only at a concentration of 1% w/w or less, and a thin film having a thickness of only 0.1 μm or less could be formed by spin coating of one step. A third-order optical nonlinear constant of the film was $2.2 \times 10^{-10}$ esu. A mask having a 5.0-μm wide waveguide shape was overlapped on the resultant substrate, and the substrate was exposed by 100-W heavy hydrogen lamp for 15 minutes. After the mask was removed, it was confirmed that a refractive index in a portion irradiated with ultraviolet rays was decreased to be smaller than that in a non-irradiated portion. As a result, a core portion having a width of 5 μm was formed. The two end faces of the waveguide were polished, and aluminum was deposited thereon to manufacture an optical bistable device structure. A 1.06-μm YAG laser was incident on the aluminum-deposited end face using a single-mode optical fiber, and a transmitted light intensity was observed as a function of an incident light intensity. As a result, although a hysteresis exhibiting optical bistability was confirmed at room temperature, a signal intensity was 1/1,000 or less that obtained in Example 6. In addition, a film having a thickness of 1 μm or more was formed by repeating spin coating, and it was attempted to confirm an optical bistable operation as described above. However, since a film thickness precision and optical uniformity of film quality were significantly inferior to those obtained in Example 6, no hysteresis could be confirmed.

The basic structure of the copolymer 50B was as follows:

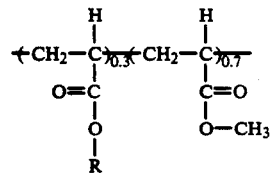

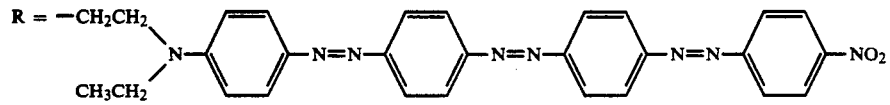

50B

EXAMPLE 7

A CPW gold electrode was formed by a plating method on a silicon substrate on which silica glass was formed by thermal oxidation, and OMR-83 as a negative resist was buried in a recess portion near the electrode to flatten the recess. After PMMA was coated on the resultant structure to form a lower cladding layer, a 6.0-$\mu$m thick film consisting of each of the copolymers 36 to 47 described in Example 5 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 $\mu$m was incident on the waveguide using a single-mode fiber. As a result, optical modulation was able to be performed by a drive voltage of 1.8 to 2.2 V. An extinction ratio of a signal was 18 to 20 dB. An electrooptical constant of these materials was 140 to 180 pm/V.

COMPARATIVE EXAMPLE 7

A CPW gold electrode was formed by a plating method on a silicon substrate on which silica glass was formed by thermal oxidation, and OMR-83 as a negative resist was buried in a recess portion near the electrode to flatten the recess. After PMMA was coated on the resultant structure to form a lower cladding layer, a 0.1-$\mu$m thick film consisting of each of the copolymers 48 to 50 described in Example 5 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 $\mu$m was incident on the waveguide using a single-mode fiber. As a result, although optical modulation was able to be performed by a drive voltage of 1.8 to 2.2 V, an extinction ratio of a signal was as very low as 1/1,000 or less that obtained in Example 7.

Subsequently, in the manufacture of the above Mach Zehnder interferometer, a 1-$\mu$m thick film consisting of each of the copolymers 48 to 50 was formed by repeating spin coating ten times or more. When laser light having a wavelength of 1.3 $\mu$m was directly coupled to the waveguide using a single-mode fiber, no modulation signal was observed.

EXAMPLE 8

Figure 6:
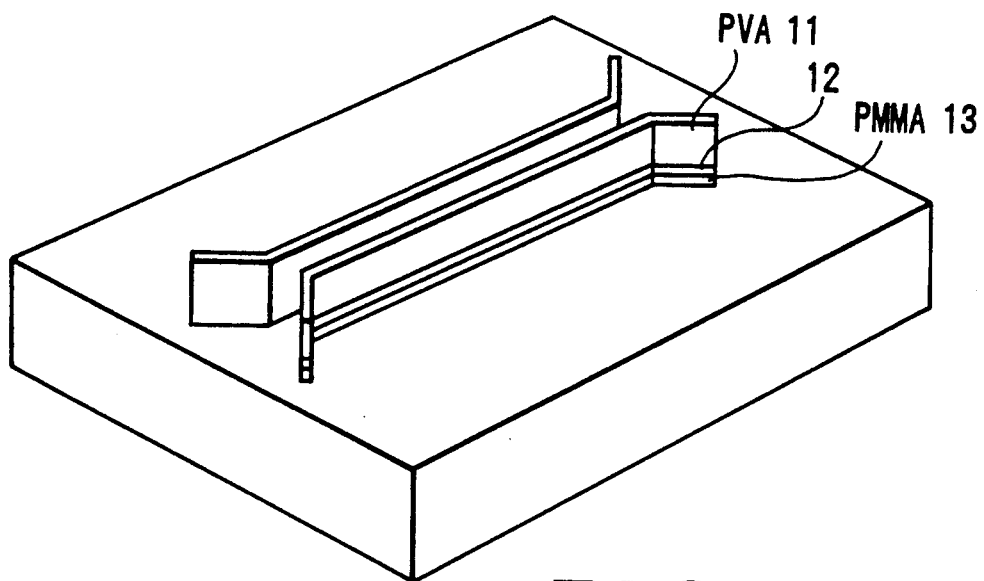
FIG. 6 is a perspective view showing a structure of a channel waveguide having a pattern of an optical coupler.

After PMMA was coated on a silicon substrate on which silica glass was formed by thermal oxidation to form a lower cladding layer, the following copolymer 50C was coated from a chlorobenzene solution (11% w/w) to have a thickness of 6 $\mu$m by the spin coating method. The copolymer was synthesized following the same procedures as in Example 5. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of an optical coupler as shown in FIG. 6. Laser light having a wavelength of 1.3 $\mu$m was incident on the waveguide using a single-mode fiber. As a result, it was confirmed that output light could be switched depending on an input light intensity at one end. An extinction ratio of a signal was 18 to 20 dB. A third-order nonlinear optical coefficient was $1.5 \times 10^{-8}$ esu. Referring to FIG. 6, reference numeral 11 denotes PVA; 12, a nonlinear optical polymer (sample); and 13, PMMA.

The basic structure of the copolymer 50C was as follows.

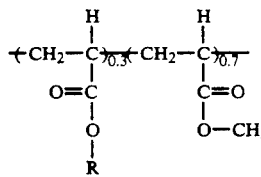
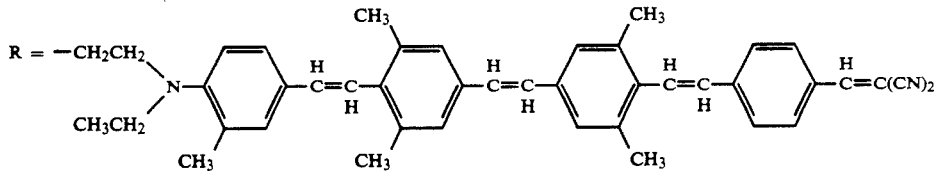

50C

COMPARATIVE EXAMPLE 8

After PMMA was coated on a silicon substrate on which silica glass was formed by thermal oxidation to form a lower cladding layer, the following copolymer 50D was spin-coated from a chlorobenzene solution. However, since a solubility was 1% w/w or less, a film having a thickness of 0.1 μm or more could not be formed. The copolymer was synthesized following the same procedures as in Example 5. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of an optical coupler as shown in FIG. 6. Laser light having a wavelength of 1.3 μm was incident on the waveguide using a single-mode optical fiber. As a result, although it was confirmed that output light could be switched depending on an input light intensity at one end, an extinction ratio of a signal was as very low as 1/1,200 or less that obtained in Example 8. Note that a third-order nonlinear optical coefficient of the material was $1.7 \times 10^{-10}$ esu.

Subsequently, in the manufacture of the above Mach Zehnder interferometer, a 1-μm thick film consisting of the copolymer 50D was formed by repeating spin coating ten times or more. When laser light having a wavelength of 1.3 μm was directly coupled to the waveguide using a single-mode fiber, no switching operation was observed.

The basic structure of the copolymer 50D was as follows:

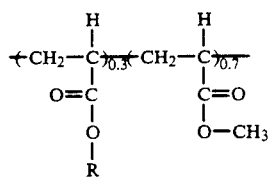
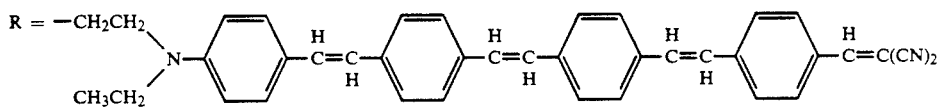

50D

EXAMPLE 9

A CPW gold electrode was formed by a plating method on a silicon substrate on which silica glass was formed by thermal oxidation, and OMR-83 as a negative resist was buried in a recess portion near the electrode to flatten the recess. After PMMA was coated on the resultant structure to form a lower cladding layer, a 6.0-μm thick film consisting o the following copolymer 50E was coated. This copolymer was synthesized following the same procedures as in Examples 1, 2, and 3. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, optical modulation was able to be performed by a drive voltage of 1.9 V. An extinction ratio of a signal was 18 to 20 dB. An electrooptical constant of these materials was 140 pm/V.

The basic structure of the copolymer 50E was as follows:

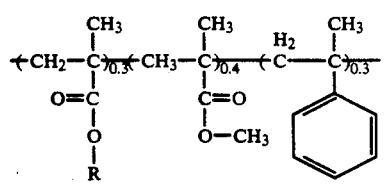
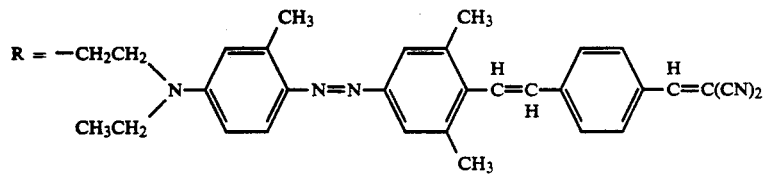

50E

COMPARATIVE EXAMPLE 9

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 50F was coated. This copolymer was synthesized following the same procedures as in Example 1, 2, and 3. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed was ultraviolet light and developed. The organic thin film layer except for the waveguide pattern portion was removed by reactive ion etching using oxygen gas, thereby manufacturing a channel waveguide having a pattern of the Mech Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 2.0 V, an extinction ratio of a signal was as very low as 1/1,000 or less that obtained in Example 9.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymer 50F was as follows:

EXAMPLE 10

A copolymer presented below was synthesized following the same procedures as in Example 5. Film formation was performed from a methylcellosolve acetate solution (20% w/w) by the spin coating method.

Subsequently, a coplanar-waveguide type gold electrode was formed by a plating method on a silicon substrate on which CORNING 7059 glass as multi-component glass was formed by sputtering, and OMR-83 as a negative resist was buried in a recess portion near the electrode to flatten the recess. After PVA was coated on the resultant structure to form a lower cladding layer, a 8.0-μm thick film consisting of the copolymer 50G was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 4.0 to 5.0 V. An extinction ratio of a signal was 18 to 20 dB, and an electrooptical constant was 30 pm/V.

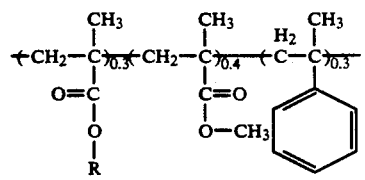
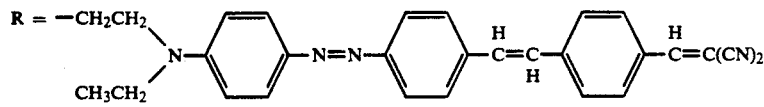

50F

The basic structure of the compound 50G was as follows:

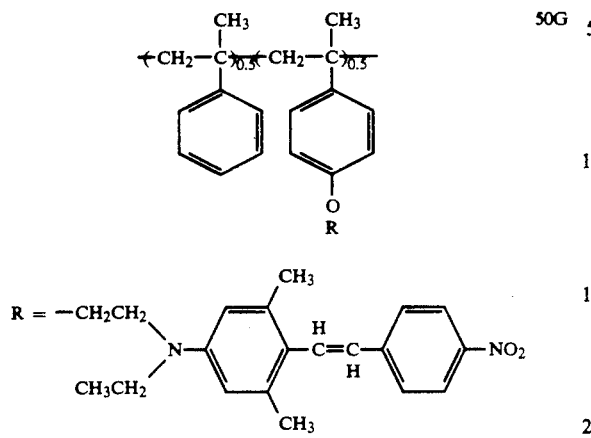

COMPARATIVE EXAMPLE 10

A copolymer presented below was synthesized following the same procedures as in Example 5. Film formation was performed from a cellosolve acetate solution by the spin coating method. Since a solubility of the copolymer 50H in cellosolve acetate was 7.0% w/w or less, a film having a thickness of 1.5 μm or more could not be formed.

Subsequently, a coplanar-waveguide type gold electrode 3 was formed by a plating method on a silicon substrate on which CORNING 7059 glass 2 as multicomponent glass was formed by sputtering, and OMR-83 as a negative resist 4 was buried in a recess portion near the electrode to flatten the recess. After PVA was coated on the resultant structure to form a lower cladding layer 5, a 1.5-μm thick film consisting of the compound was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 4.0 to 5.0 V. However, since a coupling efficiency of incident light was very low, an extinction ratio of a signal was about 1/40 that obtained in Example 10.

Subsequently, in the manufacture of the above Mach Zehnder interferometer, a 6.0-μm thick film was formed by repeating spin coating four times or more. End face polishing was performed for this waveguide, and laser light having a wavelength of 1.3 μm was directly coupled to the waveguide using a single-mode fiber. As a result, optical modulation was able to be performed by a drive voltage of 4.0 to 5.0 V. However, an extinction ratio of a signal was about 1/100 that obtained in Example 3.

The basic structure of the copolymer 50H was as follows:

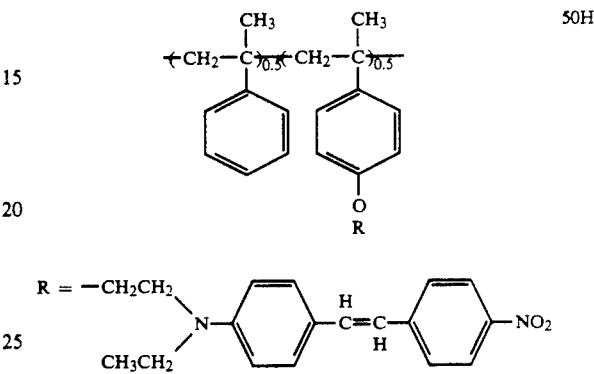

EXAMPLE 11

The following copolymer was synthesized by a route presented below. Film formation was performed from a cellosolve acetate solution (18% w/w) by the spin coating method.

Subsequently, a coplanar-waveguide type gold electrode was formed by a plating method on a silicon substrate on which CORNING 7059 glass as multi-component glass was formed by sputtering, and OMR-83 as a negative resist was buried in a recess portion near the electrode to flatten the recess. After PVA was coated on the resultant structure to form a lower cladding layer, a 6.0-μm thick film consisting of the copolymer 50I was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 3.0 to 4.0 V. An extinction ratio of a signal was 18 to 20 dB, and an electrooptical constant was 76 pm/V.

The basic structure of the copolymer 50I was as follows:

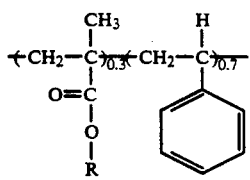
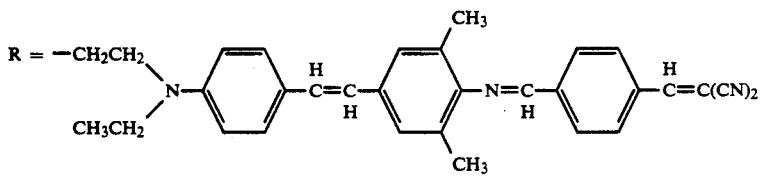

501

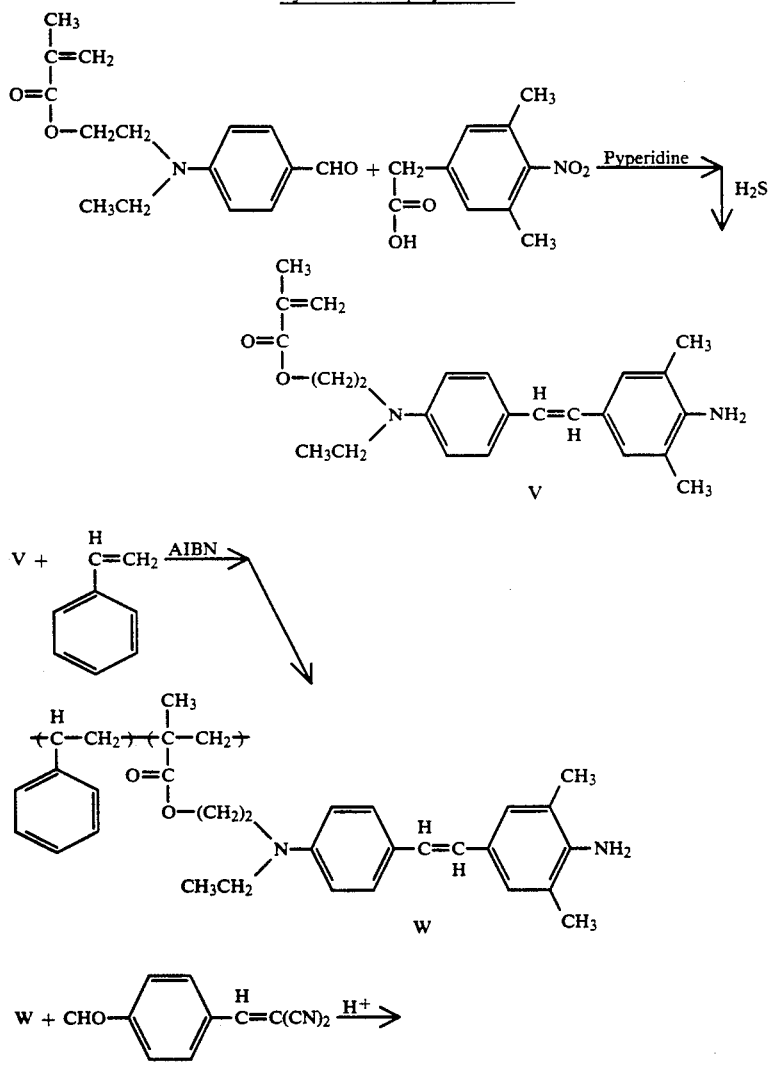

COMPARATIVE EXAMPLE 11

A copolymer presented below was synthesized following the same procedures as in Example 11. Film formation was performed from a cellosolve acetate solution by the spin coating method. Since a solubility of the compound in cellosolve acetate was 2.0% w/w or less, a film having a thickness of 0.3 μm or more could not be formed.

Subsequently, a coplanar-waveguide gold electrode 3 was formed by a plating method on a silicon substrate on which CORNING 7059 glass 2 as multi-component glass was formed by sputtering, and OMR-83 as a negative resist 4 was buried in a recess portion near the electrode to flatten the recess. After PVA was coated on the resultant structure to form a lower cladding layer 5, a 0.3-μm thick film consisting of the copolymer 50J was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 3.0 to 4.0 V.

However, since a coupling efficiency of incident light was very low, an extinction ratio of a signal was about 1/1,000 that obtained in Example 10.

Subsequently, in the manufacture of the above Mach Zehnder interferometer, a 3.0-μm thick film was formed by repeating spin coating ten times or more. End face polishing was performed for this waveguide, and laser light having a wavelength of 1.3 μm was directly coupled to the waveguide using a single-mode fiber. As a result, no modulation signal was observed.

The basic structure of the copolymer 50J was as follows:

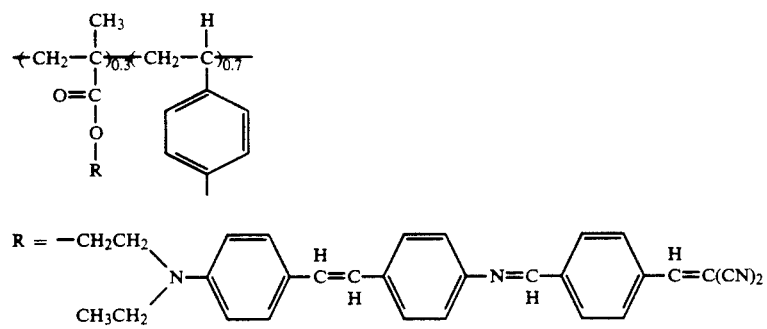

50J

EXAMPLE 12

A copolymer 50K presented below was synthesized following the same procedures as in Example 4. The copolymer was dissolved in chlorobenzene at a concentration of 7.0% w/w, and a 5.0-μm thick thin film was formed on a glass substrate by the spin coating method. A third-order nonlinear optical coefficient of the film was $2.1 \times 10^{-10}$ esu. A mask having a 5.0-μm wide waveguide shape was overlapped on the resultant substrate, and the substrate was exposed by 100-W heavy hydrogen lamp for 15 minutes. After the mask was removed, it was confirmed that a refractive index in a portion irradiated with ultraviolet rays was decreased to be smaller than that in a non-irradiated portion. As a result, a core portion having a width of 5 μm was formed. The two end faces of the waveguide were polished, and aluminum was deposited thereon to manufacture an optical bistable device structure. A 1.06-μm YAG laser was incident on the aluminum-deposited end face using a single-mode optical fiber, and a transmitted light intensity was observed as a function of an incident light intensity. As a result, a hysteresis exhibiting optical bistability was confirmed at room temperature.

The basis structure of the copolymer 50K was as follows:

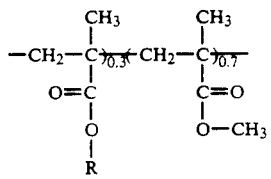

50K

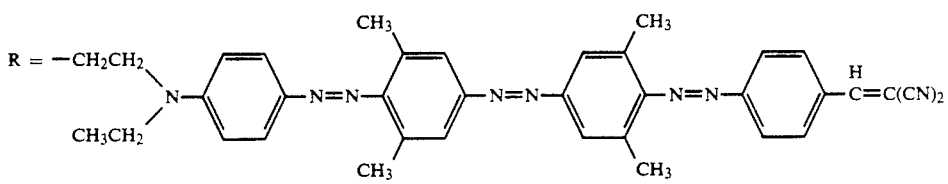

COMPARATIVE EXAMPLE 12

A copolymer 50L presented below was synthesized following the same procedures as in Example 4. The compound could be dissolved in chlorobenzene only at a concentration of 1% w/w or less, and a thin film having a thickness of only 0.1 μm or less could be formed by spin coating of one step. A third-order nonlinear optical coefficient of the film was $2.0 \times 10^{-10}$ esu. A mask having a 5.0-μm wide waveguide shape was overlapped on the resultant substrate, and the substrate was exposed by 100-W heavy hydrogen lamp for 15 minutes. After the mask was removed, it was confirmed that a refractive index in a portion irradiated with ultraviolet rays was decreased to be smaller than that in a non-irradiated portion. As a result, a core portion having a width of 5 μm was formed. The two end faces of the waveguide were polished, and aluminum was deposited thereon to manufacture an optical bistable device structure. A 1.06-μm YAG laser was incident on the aluminum-deposited end face using a single-mode optical fiber, and a transmitted light intensity was observed as a function of an incident light intensity. As a result, although a hysteresis exhibiting optical bistability was confirmed at room temperature, a signal intensity was 1/1,000 or less that obtained in Example 6. In addition, a film having a thickness of 1 μm or more was formed by repeating spin coating, and it was attempted to confirm an optical bistable operation as described above. However, since a film thickness precision and optical uniformity of film quality were significantly inferior to those obtained in Example 12, no hysteresis could be confirmed.

The basic structure of the copolymer 50L was as follows:

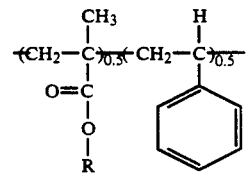

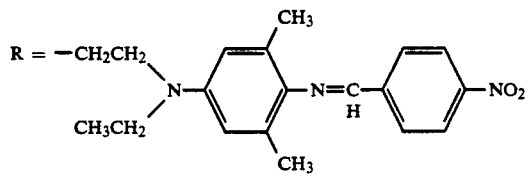

COMPARATIVE EXAMPLE 13

A CPW gold electrode was formed by a plating method on a silicon substrate on which silica glass was formed by thermal oxidation, and OMR-83 as a nega-

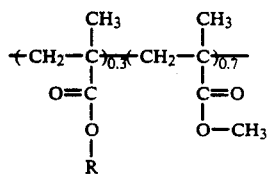

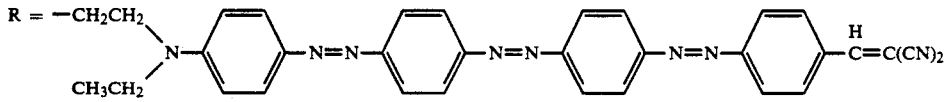

50L

EXAMPLE 13

A CPW gold electrode was formed by a plating method on a silicon substrate on which silica glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 50M was coated. This copolymer was synthesized following the same procedures as in Example 11. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 5.1 V. An extinction ratio of a signal was 18 to 20 dB. An electrooptical constant of these materials was 28 pm/V.

The basic structure of the copolymer 50M was as follows:

tive resist was buried in a recess portion near the electrode to flatten the recess. After PMMA was coated on the resultant structure to form a lower cladding layer, a 0.1-μm thick film consisting of the following copolymer 50N was coated. This copolymer was synthesized following the same procedures as in Example 11. Since a solubility of the copolymer in a coating solvent was low, a film having a thickness of 1.0 μm or more could not be formed. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 4.9 V, an extinction ratio of a signal was as very low as 1/1,000 or less that obtained in Example 7.

Subsequently, in the manufacture of the above Mach Zehnder interferometer, a 1-μm thick film consisting of each of the compounds 48 o 50 was formed by repeating spin coating ten times or more. When laser light having a wavelength of 1.3 μm was directly coupled to the waveguide using a single-mode fiber, no modulation signal was observed.

The basic structure of the copolymer 50N was as follows:

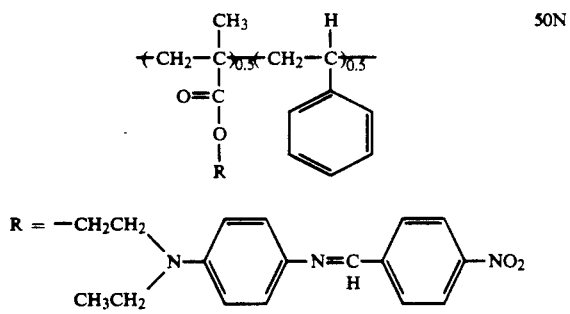

EXAMPLE 14

Copolymers 51 to 53 presented below were synthesized following the same procedures as in Example 4.

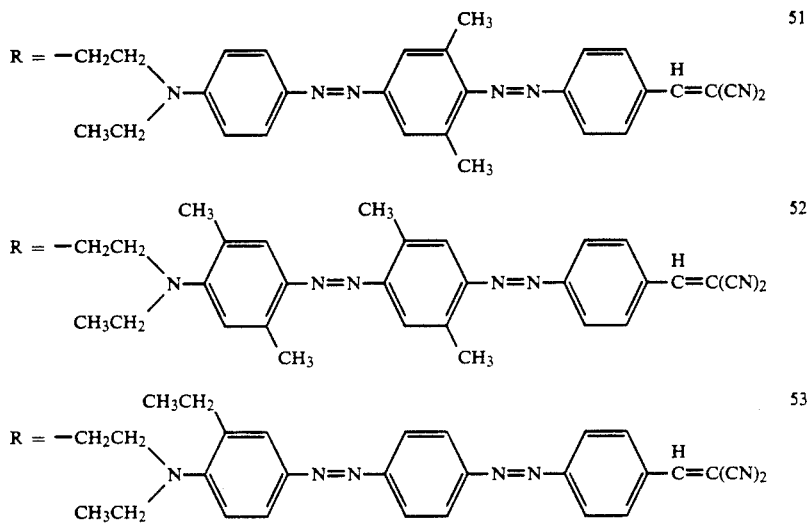

The basic structure of the copolymers 51 to 53 was as follows:

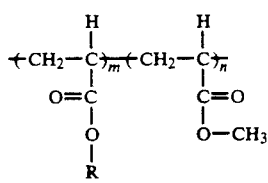

Film formation was performed from a methylcellosolve acetate solution by the spin coating method. A solubility in the solvent, a film thickness obtained by spin coating of one step, and a corresponding film thickness variation were as shown in Table 16.

Subsequently, a coplanar-waveguide type (CPW) gold electrode was formed by a plating method on a silicon on which CORNING 7059 glass was formed by sputtering, and OMR-83 as a negative resist was buried in a recess portion near the electrode to flatten the recess. After PMMA was coated on the resultant structure to form a lower cladding layer, a 6.0-μm thick film consisting of each of the compounds 51 to 53 was coated by the spin coating method. PVA was coated on the film to form an upper cladding layer, and MICROPOSIT S1400-27 as a positive resist was heated at 195° C. for about one hour to form a hard coat layer. A silicon-based positive resist was coated on the hard coat layer, and a mask was overlapped such that a waveguide pattern was placed on a central conductor of the electrode. Thereafter, the resultant structure was exposed with ultraviolet light and developed. The organic thin film layer except for the waveguide pattern portion was removed by reactive ion etching using oxygen gas. In addition, a thin film of oxidized silicon formed on the surface was removed by a hydrofluoric acid buffer solution, and the silicon-based positive resist was removed by an alkali solution. Thereafter, reactive ion etching using oxygen gas was performed again to remove the hard coat layer, thereby manufacturing a channel waveguide having a pattern of the Mach Zehnder interferometer as shown in FIG. 5. The silicon substrate having this polymer thin film was sandwiched between electrodes as shown in FIG. 1, and the polymer portion was subjected to a poling treatment. End face polishing was performed for the waveguide, and laser light having a wavelength of 1.3 μm was directly coupled to the waveguide using a single-mode fiber. As a result, optical modulation was able to be performed by a drive voltage of 1.5 to 2.0 V. An extinction ratio of a signal was 18 to 20 dB. An electrooptical constant of these materials was 160 to 2120 pm/V. These results and a transmission loss of the manufactured waveguide are shown in Table 17.

TABLE 16

| Material No. | Optical nonlinear material content (mol %) | Solubility (% w/w) | Film thickness (μm) | Film thickness variation (%/cm²) |
|---|---|---|---|---|
| 51 | 25 | 14 | 6 | 1.2 |
| 52 | 30 | 16 | 5 | 1.1 |
| 53 | 25 | 15 | 5 | 1.0 |

TABLE 17

| Material No. | Transmission loss (dB/cm) | Drive voltage (V) | Extinction ratio (dB) | Electrooptical constant (pm/V) |
|---|---|---|---|---|
| 51 | 1.2 | 1.8 | 19 | 185 |
| 52 | 1.0 | 1.7 | 20 | 190 |

TABLE 17-continued

| Material | Transmission loss | Drive voltage | Extinction ratio | Electrooptical constant |
|---|---|---|---|---|
| No. | (dB/cm) | (V) | (dB) | stant (pm/V) |
| 53 | 1.1 | 1.8 | 19 | 185 | the copolymer 30, where the compounds having the following structural formulas (54'–56') correspond to the compound P on page 45, line 23.

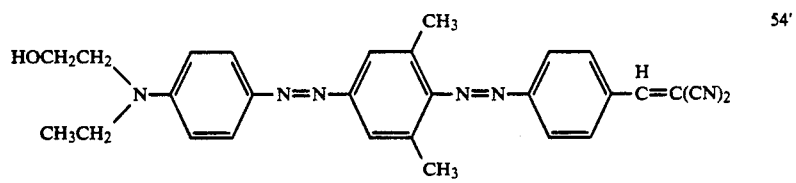

54'

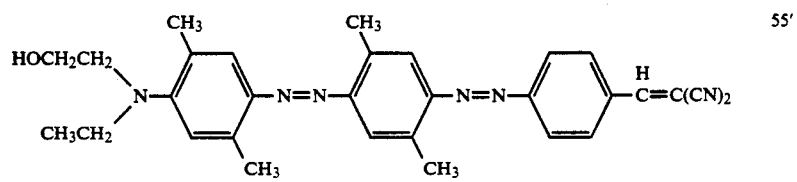

55'

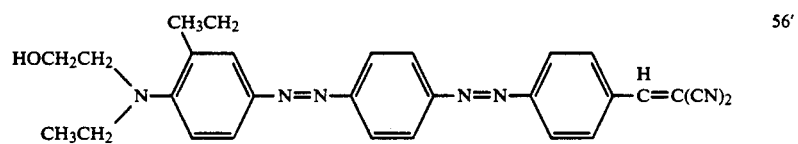

56'

The copolymer having the following structural formula:

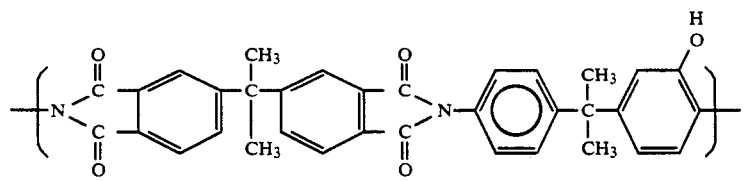

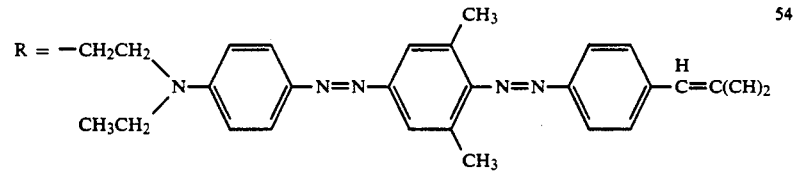

54

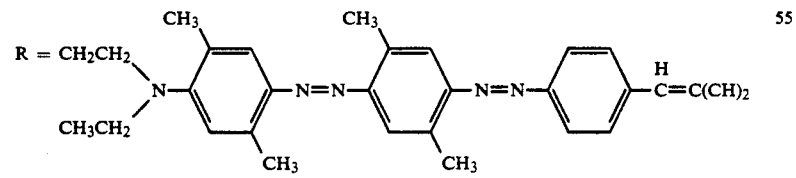

55

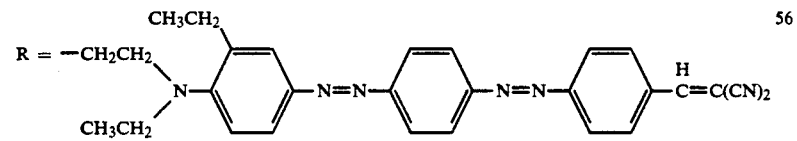

56

EXAMPLE 15

Copolymers 54 to 56 presented below were synthesized in accordance with the synthesizing procedure of the copolymer 30.

The basic structure of the compounds 54 to 56 was as follows:

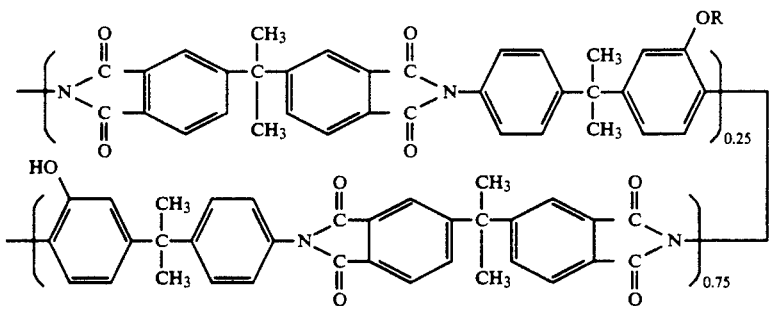

Film formation was performed from a methylcellosolve acetate solution by the spin coating method. A solubility in the solvent, a film thickness obtained by spin coating of one step, and a corresponding film thickness variation were as shown in Table 18.

Subsequently, a coplanar-waveguide type gold electrode was formed by a plating method on a silicon substrate on which CORNING 7059 glass as multi-component glass was formed by sputtering, and OMR-83 as a negative resist was buried in a recess portion near the electrode to flatten the recess. After PVA was coated on the resultant structure to form a lower cladding layer, a 6.0-$\mu$m thick film consisting of each of the compounds 54 to 56 was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 $\mu$m was directly coupled to the waveguide using a single-mode fiber. As a result, optical modulation was able to be performed by a drive voltage of 2.0 to 3.0 V. An extinction ratio of a signal was 18 to 20 dB. These results and a transmission loss of the manufactured waveguide are shown in Table 19.

TABLE 18

| Material No. | Optical nonlinear material content (mol %) | Solubility (% w/w) | Film thickness ($\mu$m) | Film thickness variation (%/cm$^2$) |
|---|---|---|---|---|
| 54 | 25 | 12 | 5 | 1 |
| 55 | 25 | 15 | 6 | 1 |
| 56 | 25 | 12 | 6 | 1 |

TABLE 19

| Material No. | Transmission loss (dB/cm) | Drive voltage (V) | Extinction ratio (dB) |
|---|---|---|---|
| 54 | 1.1 | 2.0 | 18 |
| 55 | 0.9 | 2.5 | 20 |

TABLE 19-continued

| Material No. | Transmission loss (dB/cm) | Drive voltage (V) | Extinction ratio (dB) |
|---|---|---|---|
| 56 | 1.0 | 2.2 | 20 |

COMPARATIVE EXAMPLE 15

A copolymer 57 presented below was synthesized following the same procedures as in Example 15. Film formation was performed from a cellosolve acetate solution by the spin coating method. A solubility in the solvent, a film thickness obtained by spin coating of one step was 1 $\mu$m or less, and a corresponding film thickness variation was 30%/cm$^2$.

Subsequently, a coplanar-waveguide type gold electrode 3 was formed by a plating method on a silicon substrate on which CORNING 7059 glass 2 as multi-component glass was formed by sputtering, and OMR-83 as a negative resist 4 was buried in a recess portion near the electrode to flatten the recess. After PVA was coated on the resultant structure to form a lower cladding layer 5, a 1.0-$\mu$m thick film consisting of the compound 57 was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 $\mu$m was directly coupled to the waveguide using a single-mode fiber. As a result, optical modulation was able to be performed by a drive voltage of 2.0 to 3.0 V. However, since a coupling efficiency of incident light was very low, an extinction ratio of a signal was about 1/40 that obtained in Example 15.

Subsequently, in the manufacture of the above Mach Zehnder interferometer, a 6.0-$\mu$m thick film of the copolymer 57 was formed by repeating spin coating four times or more. End face polishing was performed for this waveguide, and laser light having a wavelength of 1.3 $\mu$m was directly coupled to the waveguide using a single-mode fiber. As a result, optical modulation was able to be performed by a drive voltage of 2.0 to 3.0 V. However, a transmission loss of the waveguide layer and a film thickness variation (35%/cm²) were much larger than those obtained in Example 15, and an extinction ratio of a signal was about 1/100 that obtained in Example 15.

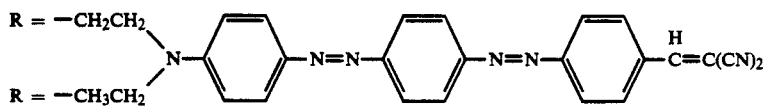

The basic structure of the copolymer 57 was as follows:

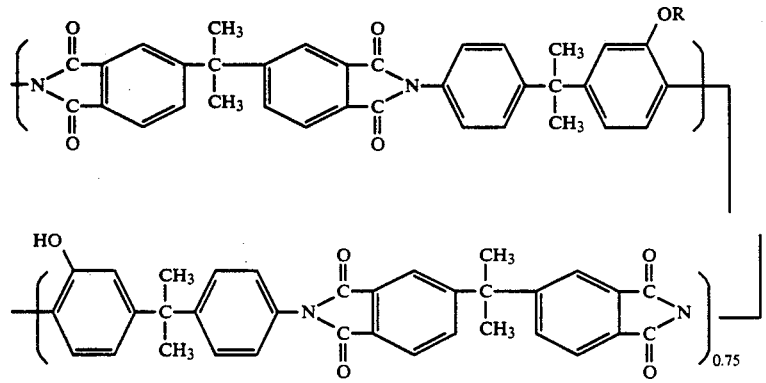

EXAMPLE 16

The following copolymers 58 to 60 were synthesized.

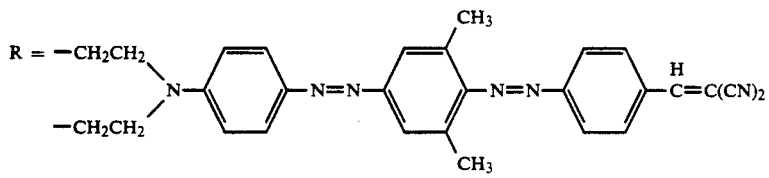

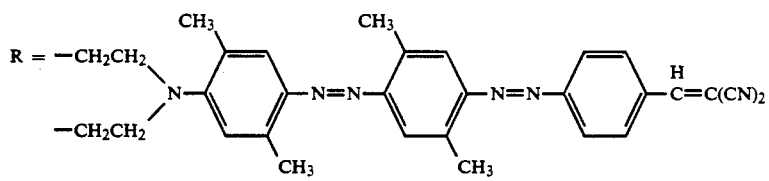

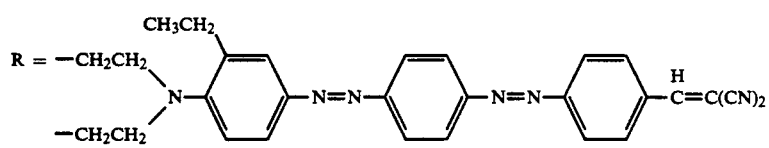

The basic structure of the copolymers 58 to 60 was as follows:

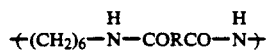

Film formation was performed from a cellosolve acetate solution by the spin coating method. A solubility in the solvent, a film thickness obtained by spin coating of one step, and a corresponding film thickness variation were as shown in Table 20.

Subsequently, a coplanar-waveguide type gold electrode was formed by a plating method on a silicon substrate on which CORNING 7059 glass as multi-component glass was formed by sputtering, and OMR-83 as a negative resist was buried in a recess portion near the electrode to flatten the recess. After PVA was coated on the resultant structure to form a lower cladding layer, a 6.0-μm thick film consisting of each of the compounds 58 to 60 was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 2.0 to 3.0 V. An extinction ratio of a signal was 18 to 20 dB. These results and a transmission loss of the manufactured waveguide are shown in Table 21.

TABLE 20

| Material No. | Optical nonlinear material content (mol %) | Solubility (% w/w) | Film thickness (μm) | Film thickness variation (%/cm$^2$) |
|---|---|---|---|---|
| 58 | 100 | 12 | 6.0 | 2.0 |
| 59 | 100 | 11 | 5.5 | 1.8 |
| 60 | 100 | 14 | 5.2 | 1.9 |

TABLE 21

| Material No. | Transmission loss (dB/cm) | Drive voltage (V) | Extinction ratio (dB) |
|---|---|---|---|
| 58 | 1.1 | 2.5 | 18 |
| 59 | 0.9 | 2.7 | 19 |
| 60 | 1.1 | 2.2 | 21 |

COMPARATIVE EXAMPLE 16

A copolymer 61 presented below was synthesized following the same procedures as for the copolymers 58 to 60. Film formation was performed from a methylcellosolve acetate solution by the spin coating method. A solubility in the solvent, a film thickness obtained by spin coating of one step was 0.5 μm or less, and a corresponding film thickness variation was 25%/cm$^2$.

Subsequently, a coplanar-waveguide gold electrode 3 was formed by a plating method on a silicon substrate on which CORNING 7059 glass 2 as multi-component glass was formed by sputtering, and OMR-83 as a negative resist 4 was buried in a recess portion near the electrode to flatten the recess. After PVA was coated on the resultant structure to form a lower cladding layer 5, a 1.0-μm thick film consisting of the compound 61 was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 2.0 to 3.0 V. However, since a coupling efficiency of incident light was very low, an extinction ratio of a signal was about 1/40 that obtained in Example 16.

Subsequently, in the manufacture of the above Mach Zehnder interferometer, a 6.0-μm thick film of the compound 61 was formed by repeating spin coating four times or more. End face polishing was performed for this waveguide, and laser light having a wavelength of 1.3 μm was directly coupled to the waveguide using a single-mode fiber. As a result, optical modulation was able to be performed by a drive voltage of 2.0 to 3.0 V. However, a transmission loss of the waveguide layer and a film thickness variation (35%/cm$^2$) were much larger than those obtained in Example 16, and an extinction ratio of a siganl was about 1/100 that obtained in Example 16.

The basic structure of the copolymer 61 was as follows:

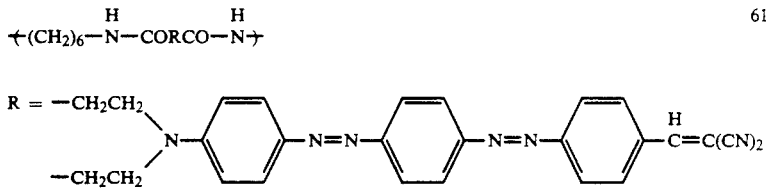

61

EXAMPLE 17

The following copolymers 62 to 64 were synthesized.

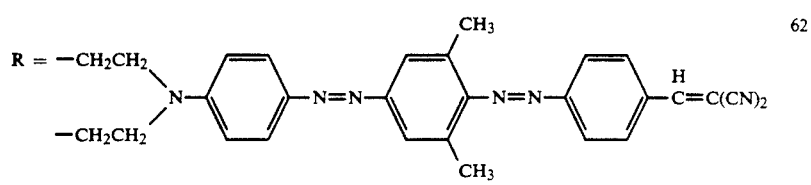

62

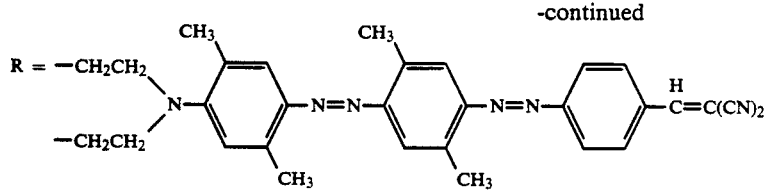

63

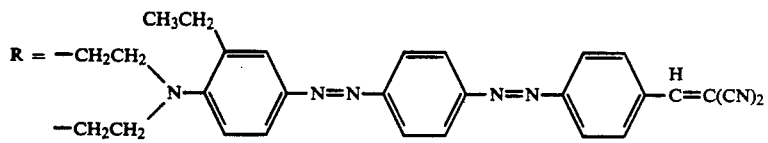

64

The synthesis was performed as follows.

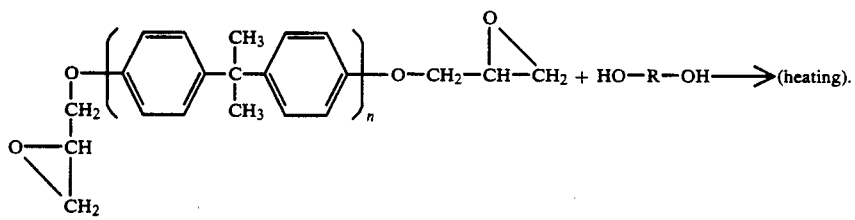

The basic structure of the copolymers 62 to 64 was as follows:

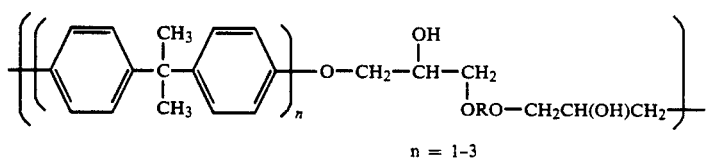

n = 1-3

Formation of a film cured with heat at 80° C. for ten minutes was performed from a methylcellosolve acetate solution by the spin coating method. A solubility in the solvent, a film thickness obtained by spin coating of one step, and a corresponding film thickness variation were as shown in Table 22. Lastly, the film was hardened with heat at 120° C. for three hours.

Subsequently, a coplanar-waveguide type gold electrode was formed by a plating method on a silicon substrate on which CORNING 7059 glass as multi-component glass was formed by sputtering, and OMR-83 as a negative resist was buried in a recess portion near the electrode to flatten the recess. After PVA was coated on the resultant structure to form a lower cladding layer, a 6.0-μm thick film consisting of each of the copolymers 62 to 64 was coated by the spin coating method. The resultant silicon substrate having this polymer thin film was sandwiched between electrodes as shown in FIG. 1, and the polymer portion was subjected to a poling treatment. Thereafter, a photosetting resin was coated, and ultraviolet light was radiated to form an upper cladding layer. A silicon-based positive resist was coated on the upper cladding layer, and a mask was overlapped such that a waveguide pattern was placed on a central conductor of the coplanar electrode. Thereafter, the resultant structure was exposed with ultraviolet light and developed. The organic thin film layer except for the waveguide pattern portion was removed by reactive ion etching using oxygen gas to manufacture a channel waveguide having a pattern of a Mach Zehnder interferometer as shown in FIG. 5. End face polishing was performed for the waveguide, and laser light having a wavelength of 1.3 μm was directly coupled to the waveguide using a single-mode fiber. As a result, optical modulation was able to be performed by a drive voltage of 2.0 to 3.0 V. An extinction ratio of a signal was 18 to 20 dB. These results and a transmission loss of the manufactured waveguide are shown in Table 23.

TABLE 22

| Material No. | Optical nonlinear material content (mol %) | Solubility (% w/w) | Film thickness (μm) | Film thickness variation (%/cm²) |
|---|---|---|---|---|
| 62 | 100 | 20 | 20 | 1.1 |
| 63 | 100 | 22 | 18 | 0.8 |
| 64 | 100 | 23 | 16 | 0.9 |

TABLE 23

| Material No. | Transmission loss (dB/cm) | Drive voltage (V) | Extinction ratio (dB) |
|---|---|---|---|
| 62 | 1.1 | 2.0 | 18 |
| 63 | 0.9 | 2.5 | 20 |
| 64 | 1.0 | 2.2 | 22 |

EXAMPLE 18

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 65 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 2.3 V. An extinction ratio of a signal was 19 dB. An electrooptical constant of these materials was 150 pm/V.

COMPARATIVE EXAMPLE 18

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 66 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 2.3 V, an extinction ratio of a signal was as very low as 1/1,000 or less that obtained in Example 18.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymers 65 and 66 was as follows:

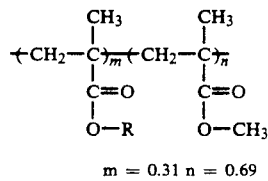

m = 0.31 n = 0.69

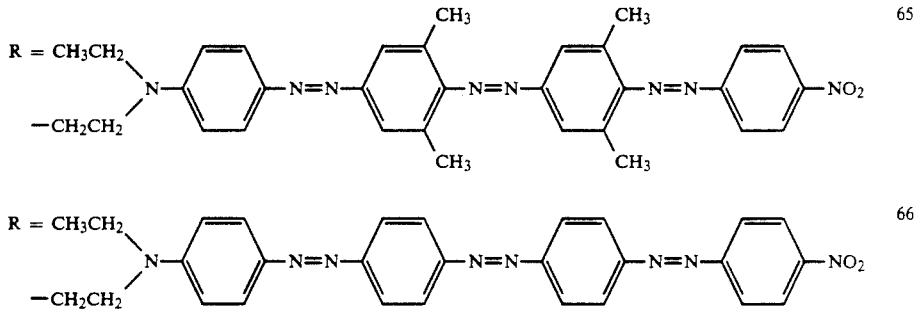

EXAMPLE 19

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 67 synthesized following the same procedures as in Example 7 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 2.3 V. An extinction ratio of a signal was 19 dB. An electrooptical constant of these materials was 170 pm/V.

COMPARATIVE EXAMPLE 19

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 68 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 2.3 V, an extinction ratio of a signal was as very low as 1/1,000 or less that obtained in Example 19.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymers 67 and 68 was as follows:

Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 1.8 V. An extinction ratio of a signal was 20 dB. An electrooptical constant of these materials was 180 pm/V.

COMPARATIVE EXAMPLE 20

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 70 synthesized following the same procedures as in Example 4 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the

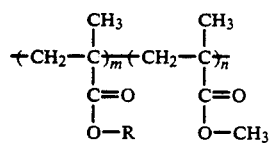

m = 0.29 n = 0.71

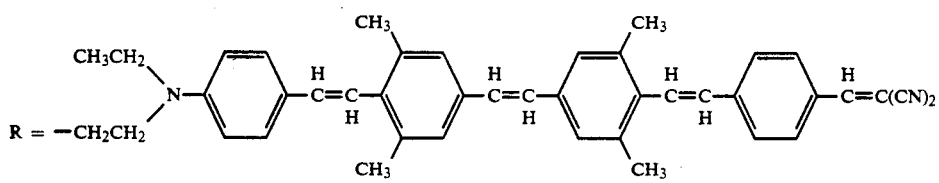

67

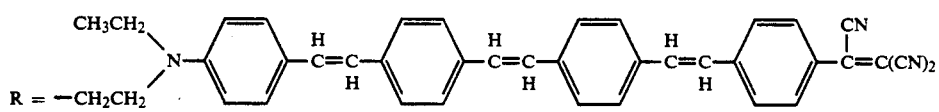

68

EXAMPLE 20

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 69 synthesized following the same procedures as in Example 4 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 2.2 V, an extinction ratio of a signal was as very low as 1/1,000 or less that obtained in Example 20.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymers 69 and 70 was as follows:

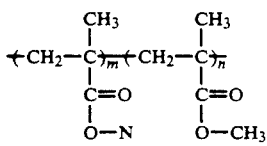

m = 0.30 n = 0.70

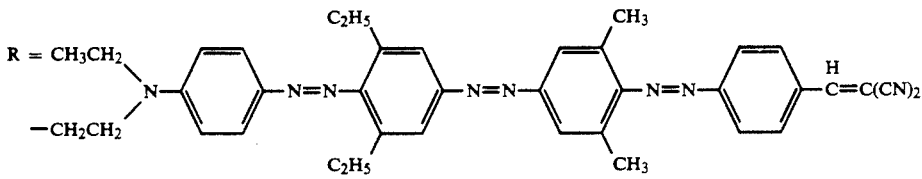

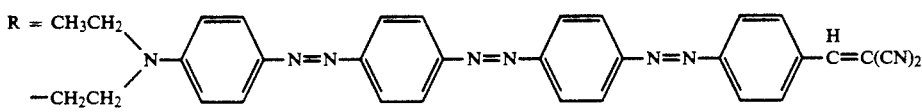

EXAMPLE 21

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 71 synthesized following the same procedures as in Example 4 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 1.8 V. An extinction ratio of a signal was 18 dB. An electrooptical constant of these materials was 190 pm/V.

COMPARATIVE EXAMPLE 21

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 72 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 1.9 V, an extinction ratio of a signal was as very low as 1/1,000 or less that obtained in Example 21.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymers 71 and 72 was as follows:

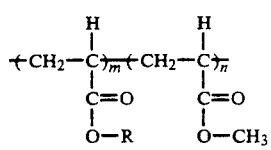

m = 0.28 n = 0.72

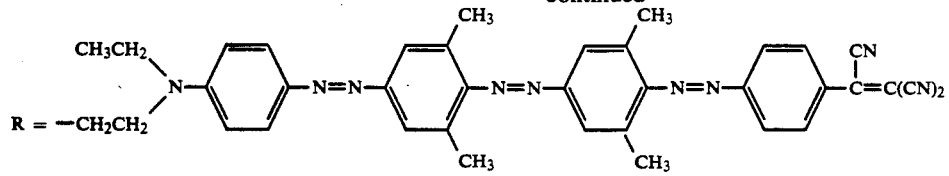

71

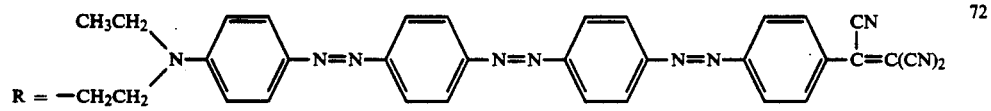

72

EXAMPLE 22

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 73 synthesized following the same procedures as in Example 4 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 1.7 V. An extinction ratio of a signal was 20 dB. An electrooptical constant of these materials was 170 pm/V.

COMPARATIVE EXAMPLE 22

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 74 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 2.2 V, an extinction ratio of a signal was as very low as 1/1,000 or less that obtained in Example 22.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymers 73 and 74 was as follows:

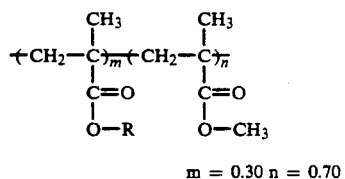

m = 0.30 n = 0.70

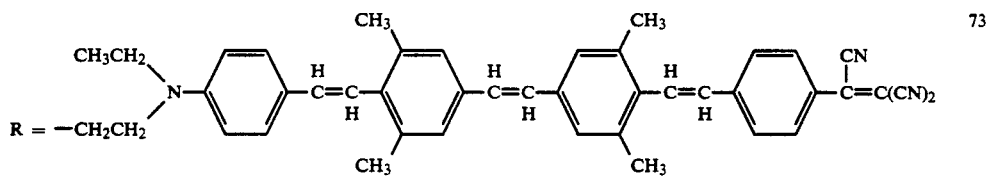

73

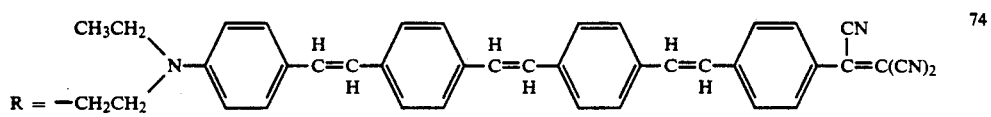

74

EXAMPLE 23

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 6.0-μm thick film consisting of the following copolymer 75 synthesized following the same procedures as in Example 7 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode optical fiber. As a result, optical modulation was able to be performed by a drive voltage of 2.2 V. An extinction ratio of a signal was 18 dB. An electrooptical constant of these materials was 150 pm/V.

COMPARATIVE EXAMPLE 23

A CPW gold electrode was formed by a plating method on a silicon substrate on which quartz glass was formed by thermal oxidation, and OMR-83 as a negative resist was buried in a recess portion near the electrode to flatten the recess. After PMMA was coated on the resultant structure to form a lower cladding layer, a 0.1-μm thick film consisting of the following copolymer 76 was coated. PVA was coated on the film to form an upper cladding layer, and MICROPOSIT S1400-27 as a positive resist was coated. A mask was overlapped such that a waveguide pattern was placed on a central conductor of the electrode, and the resultant structure was exposed with ultraviolet light and developed. The organic thin film layer except for the waveguide pattern portion was removed by reactive ion etching using oxygen gas, thereby manufacturing a channel waveguide having a pattern of the Mach Zehnder interferometer as shown in FIG. 5. This waveguide was subjected to a poling treatment using parallel flat electrodes, and laser light having a wavelength of 1.3 μm was incident on the waveguide using a single-mode fiber. As a result, although optical modulation was able to be performed by a drive voltage of 2.0 V, an extinction ratio of a signal was as very low as 1/1,000 or less that obtained in Example 23.

Subsequently, in the manufacture of the above Mach Zehnder interferometer, a 1-μm thick film was formed by repeating spin coating ten times or more. When laser light having a wavelength of 1.3 μm was directly coupled to the waveguide using a single-mode fiber, no modulation signal was observed.

The basic structure of the copolymers 75 and 76 was as follows:

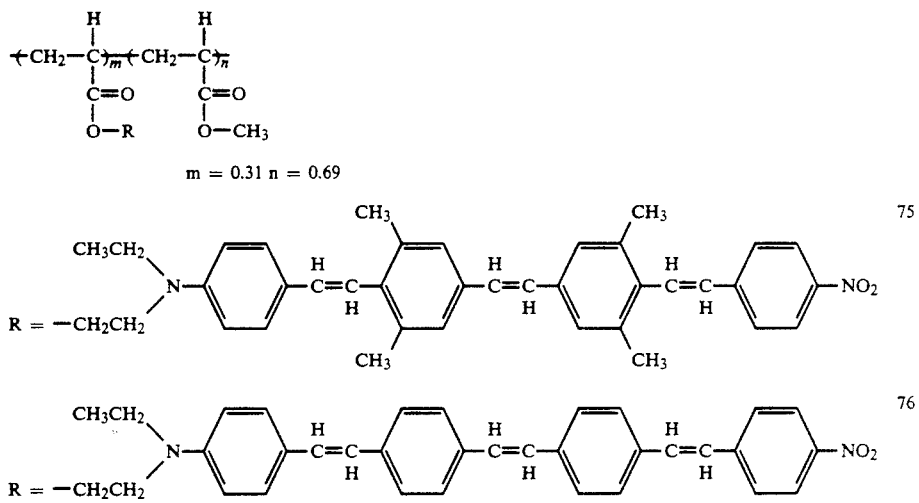

What is claimed is:

1. A second-order or third-order organic nonlinear optical material, wherein one of the compounds represented by the following formula (1) is bonded to a polymer:

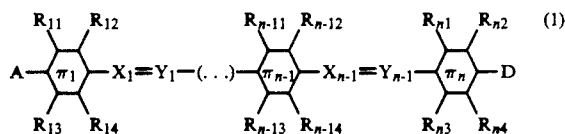

wherein each of $\pi_1$ to $\pi_n$ independently represents a cyclic compound of a $\pi$ electron conjugate system, at least one of $R_{11}$ to $R_{n4}$ represents an alkyl group or alkyl group derivative and others represent hydrogen, each of $X_1$ to $X_{n-1}$ and $Y_1$ to $Y_{n-1}$ represents one member selected from the group consisting of CH, N, and N→O —A represents an electron acceptor group, D represents an electron donor group and n is an integer of 3 or 4.

2. A material according to claim 1, wherein the following compound is bonded to said polymer;

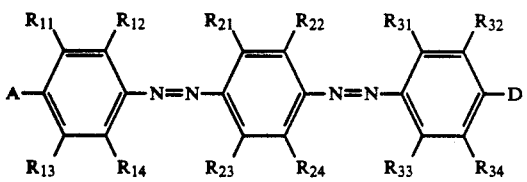

wherein at least one of $R_{11}$ to $R_{34}$ represents an alkyl group and others represent hydrogen, A represents one member selected from the group consisting of a nitro group ($-NO_2$), a dicyanovinyl group ($-CH=C(CN)_2$), and a tricyanovinyl group ($-C(CN)=C(CN)_2$), and D represents a dialkylamino group derivative.

3. A material according to claim 1, wherein the following compound is bonded to said polymer:

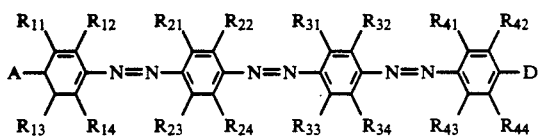

wherein at least one of $R_{11}$ to $R_{44}$ represents an alkyl group and others represent hydrogen, A represents one member selected from the group consisting of a nitro group ($-NO_2$), a dicyanovinyl group ($-CH=C(CN)_2$), and a tricyanovinyl group ($-C(CN)=C(CN)_2$), and D represents a dialkylamino group derivative.

4. A material according to claim 1, wherein the following compound is bonded to said polymer:

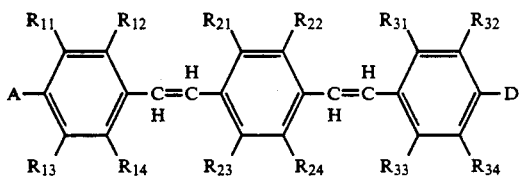

wherein at least one of $R_{11}$ to $R_{34}$ represents an alkyl group and others represent hydrogen, A represents one member selected from the group consisting of a nitro group ($-NO_2$), a dicyanovinyl group ($-CH=C(CN)_2$), and a tricyanovinyl group ($-C(CN)=C(CN)_2$), and D represents a dialkylamino group derivative.

5. A material according to claim 1, wherein the following compound is bonded to said polymer:

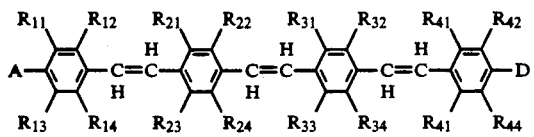

wherein at least one of $R_{11}$ to $R_{44}$ represents an alkyl group and others represent hydrogen, A represents one member selected from the group consisting of a nitro group ($-NO_2$), a dicyanovinyl group ($-CH=C(CN)_2$), and a tricyanovinyl group ($-C(CN)=C(CN)_2$), and D represents a dialkylamino group.

6. A material according to claim 1, wherein said polymer is one member selected from the group consisting of polymethacrylate, polyacrylate, polystyrene, polyimide, polyurethane, polyether, and derivatives and copolymers thereof, wherein a molecule of the formula:

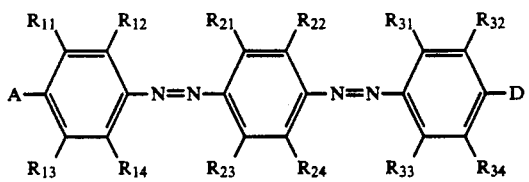

wherein $R_{11}$ to $R_{34}$ are selected from alkyl groups and hydrogen, A is selected from nitro groups ($-NO_2$), dicyanovinyl groups ($-CH=C(CN)_2$), and tricyanovinyl groups ($-C(CN)=C(CN)_2$), and D is a dialkylamino derivative, is grafted to the main chain of said polymer selected from polymethacrylate, polyacrylate, polystyrene; and derivatives and copolymers thereof, and is part of the main chain said polymer selected from polyurethane and derivatives and copolymers thereof.

7. A second-order or third-order organic nonlinear optical material, wherein the following compound is bonded to a polymer:

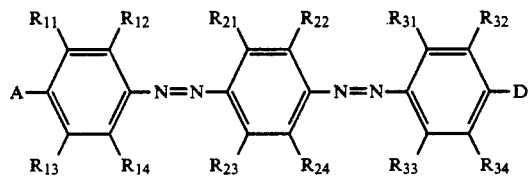

wherein at least one of $R_{11}$ to $R_{34}$ represents an alkyl group and others represent hydrogen, A represents one member selected from the group consisting of a nitro group ($-NO_2$), a dicyanovinyl group ($-CH=C(CN)_2$), and a tricyanovinyl group ($-C(CN)=C(CN)_2$), and D represents a dialkylamino group derivative.

8. A material according to claim 7, wherein said polymer is one member selected from the group consisting of polymethacrylate, polyacrylate, polystyrene, polyimide, polyurethane, polyether, and derivatives and copolymers thereof, and said material of claim 7 is grafted onto the main chain of said polymer selected from polymethacrylate, polyacrylate, polystyrene, and derivatives and copolymers thereof, and said material is part of the main chain of said polymer selected from polyurethane and derivatives and copolymers thereof.

9. A second-order or third-order organic nonlinear optical material, wherein the following compound is bonded to a polymer:

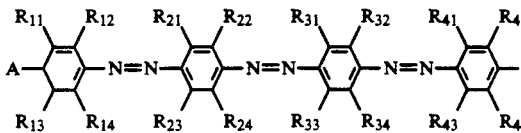

wherein at least one of $R_{11}$ to $R_{44}$ represents an alkyl group and others represent hydrogen, A represents one member selected from the group consisting of a nitro group ($-NO_2$), a dicyanovinyl group (—CH=C(CN)$_2$), and a tricyanovinyl group (—C(CN)=C(CN)$_2$), and D represents a dialkylamino group derivative.

10. A material according to claim 9, wherein said polymer is one member selected from the group consisting of polymethacrylate, polyacrylate, polystyrene, polyimide, polyurethane, polyether, and derivatives and copolymers thereof, and said material of claim 9 is grafted onto the main chain of said polymer selected from polymethacrylate, polyacrylate, polystyrene, and derivatives and copolymers thereof, and said material is part of the main chain of said polymer selected from polyurethane and derivatives and copolymers thereof.

11. A second-order or third-order organic nonlinear optical material, wherein the following compound is bonded to a polymer:

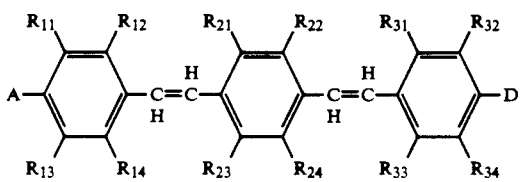

wherein at least one of $R_{11}$ to $R_{34}$ represents an alkyl group and others represent hydrogen, A represents one member selected from the group consisting of a nitro group (—NO$_2$), a dicyanovinyl group (—CH=C(CN)$_2$), and a tricyanovinyl group (—C(CN)=C(CN)$_2$), and D represents a dialkylamino group derivative.

12. A material according to claim 11, wherein the polymer is one member selected from the group consisting of polymethacrylate, polyacrylate, polystyrene, polyimide, polyurethane, polyether, and derivatives and copolymers thereof, and said material of claim 11 is grafted onto the main chain of said polymer selected from polymethacrylate, polyacrylate, polystyrene, and derivatives and copolymers thereof, and said material is part of the main chain of said polymer selected from polyurethane and derivatives and copolymers thereof.

13. A second-order or third-order organic nonlinear optical material, wherein the following compound is bonded to a polymer:

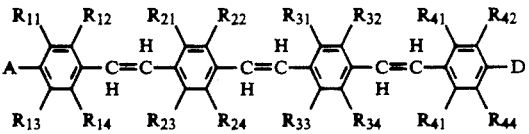

wherein at least one of $R_{11}$ to $R_{44}$ represents an alkyl group and others represent hydrogen, A represents one member selected from the group consisting of a nitro group (—NO$_2$), a dicyanovinyl group (—CH=C(CN)$_2$), and a tricyanovinyl group (—C(CN)=C(CN)$_2$), and D represents a dialkylamino group derivative.

14. A material according to claim 13, wherein said polymer is one member selected from the group consisting of polymethacrylate, polyacrylate, polystyrene, polyimide, polyurethane, polyether, and derivatives and copolymers thereof, and said material of claim 13 is grafted onto the main chain of said polymer selected from polymethacrylate, polyacrylate, polystyrene, and derivatives and copolymers thereof, and said material is part of the main chain of said polymer selected from polyurethane and derivatives and copolymers thereof.

* * * * *

UNITED STATES PATENT AND TRADEMARK OFFICE
CERTIFICATE OF CORRECTION

PATENT NO. : 5,284,922
DATED : February 8, 1994
INVENTOR(S) : Amano et al.

It is certified that error appears in the above-identified patent and that said Letters Patent is hereby corrected as shown below:

On the Title page:

Change

"[75] Inventors: Michiyuki Amano; Yoshito Shuto;
Toshikuni Kajno, all of Ibaraki, Japan"

to

-- [75] Inventors: Michiyuki Amano; Yoshito Shuto;
Toshikuni Kaino, all of Ibaraki, Japan --

Signed and Sealed this

Tenth Day of October, 1995

Attest:

BRUCE LEHMAN

*Attesting Officer*  *Commissioner of Patents and Trademarks*